United States Patent [19]

Klinefelter

[11] Patent Number: 4,965,670

[45] Date of Patent: Oct. 23, 1990

[54] ADJUSTABLE OVERLAY DISPLAY CONTROLLER

[75] Inventor: Gary M. Klinefelter, Eden Prairie, Minn.

[73] Assignee: Research, Incorporated, Eden Prairie, Minn.

[21] Appl. No.: 393,998

[22] Filed: Aug. 15, 1989

[51] Int. Cl.[5] .......... H04N 5/272

[52] U.S. Cl. .......... 358/183; 340/732; 340/750

[58] Field of Search .......... 358/183, 22; 340/750, 340/748, 747, 734, 723, 721, 720

[56] References Cited

U.S. PATENT DOCUMENTS

| | | | |
|---|---|---|---|
| Re. 32,201 | 7/1986 | Bradley | 340/747 |
| 3,978,470 | 8/1976 | McGuire | 340/324 |
| 4,266,253 | 5/1981 | Matherat | 358/903 |
| 4,296,476 | 10/1981 | Mayer et al. | 364/900 |
| 4,437,093 | 3/1984 | Bradley | 340/726 |
| 4,491,836 | 1/1985 | Collmeyer et al. | 340/747 |
| 4,504,826 | 3/1985 | Leininger | 340/734 |
| 4,517,654 | 5/1985 | Carmean | 364/521 |
| 4,555,775 | 11/1985 | Pike | 364/900 |
| 4,578,766 | 3/1986 | Caddy | 364/521 |
| 4,586,036 | 4/1986 | Thomason et al. | 340/720 |
| 4,591,845 | 5/1986 | Komatsu et al. | 340/748 |
| 4,622,546 | 11/1986 | Sfarti et al. | 340/748 |
| 4,639,721 | 1/1987 | Eto et al. | 340/748 |
| 4,639,765 | 1/1987 | D'Hont | 358/19 |
| 4,642,626 | 2/1987 | Bruce | 340/750 |
| 4,642,790 | 2/1987 | Minshull et al. | 364/900 |
| 4,646,261 | 2/1987 | Ng | 364/900 |
| 4,651,146 | 3/1987 | Lucash et al. | 340/721 |
| 4,653,020 | 3/1987 | Cheselka et al. | 364/900 |
| 4,663,617 | 5/1987 | Stockwell | 340/726 |
| 4,679,038 | 7/1987 | Bantz et al. | 340/750 |
| 4,682,297 | 7/1987 | Iwami | 358/183 |
| 4,688,033 | 8/1987 | Carini et al. | 340/800 |
| 4,688,167 | 8/1987 | Agarwal | 364/200 |
| 4,706,076 | 11/1987 | Racchini | 340/726 |
| 4,736,307 | 4/1988 | Salb | 364/518 |
| 4,739,318 | 4/1988 | Cohen | 340/750 |
| 4,780,713 | 10/1988 | Lundström | 340/750 |
| 4,812,909 | 3/1989 | Yokobayashi et al. | 358/183 |
| 4,814,756 | 3/1989 | Chauvel | 340/750 |
| 4,835,529 | 5/1989 | Ishii | 340/721 |
| 4,882,578 | 11/1989 | Minakuchi | 340/750 |
| 4,908,700 | 3/1990 | Ishii et al. | 358/22 |

*Primary Examiner*—Tommy P. Chin
*Assistant Examiner*—James Juo
*Attorney, Agent, or Firm*—Kinney & Lange

[57] ABSTRACT

A video display control system with a relative position memory between a controller and a foreground memory to permit changing the correspondence between a control indicator, indicating a display line on a monitor, and that one of the blocks of foreground memory controlling the foreground characters to be displayed on that display monitor screen line. The controller indicator signal is provided directly to a background memory to indicate which block of data therein is to control the display for the graphics background on that screen line. The relative position memory circuit also sets the first column in a test line which is to display in an allocated portion of the monitor screen. The relative position memory and the foreground memory control a symbol memory, and the outputs from the foreground memory, the symbol memory and the background memory are collected by a display controller capable of operating a display monitor.

21 Claims, 5 Drawing Sheets

ADJUSTABLE OVERLAY DISPLAY CONTROLLER

BACKGROUND OF THE INVENTION

The present invention relates to control of interactive video displays provided on a display monitor where these displays can be divided into portions termed "windows" and, more particularly, to such displays in which the contents of "window" portions thereof can be controlled independently for each such "window" provided.

The cathode ray tube, or CRT, as the basis for a video display monitor for television or computers, is well known although other types of display devices such as liquid crystal displays are being increasingly used. Typically, the monitor has a screen for presenting displays, such as the face of a cathode ray tube, over which a raster scanning means is swept, these being focused electron beams for cathode ray tubes. The sweeping activation spot traverses a horizontal line from left to right and then moves down a line to repeat that traversal pattern etc. The resulting sweep pattern is a vertical sequence of lines across the screen, each of which comprises a left to right sequence of picture elements, or pixels. Appropriately switching the electron beams "on" and "off" leads to some of the pixels being irradiated and caused to emit light while others do not to thus form patterns of bright and not so bright pixels, or various colored pixels, across the screen.

Often the desired patterns involves providing textual characters or other symbols overlaying some sort of a background pattern. Such a background pattern may have formed within it pictorial or geometric patterns, and so is often called a graphics background.

One way of displaying textual material over a graphics background is to have the characters of the text directly made part of the graphics background pattern so that they are formed together for presenting displays thereof with any change in one requiring reformulating the whole. The corresponding digital representation of each pixel in such pattern displays can then be stored in a single digital memory arrangement so that these representations have a one-to-one correspondence with the pixels on the screen of the display monitor. A video controller receives the digital representations of the pixels from such a memory arrangement and converts them into suitable signals for controlling the display monitor.

If static scenes having textual characters imbedded therein are to be shown on the screen, such a method is entirely suitable as it is for relatively slow changes in the textual display with respect to the graphics background. However, if the textual characters are to be manipulated rapidly by being changed or repositioned with respect to the graphics background, this method of jointly forming both textual characters and graphics background is slow or expensive, or both, because of the mixing of text and graphics representations in the digital memory arrangement used. For instance, any slight moving of textual characters with respect to a static graphics background requires new digital representations to be stored in the digital memory for every pixel in the display in a manner so as to leave the graphics background the same as it would have been in the absence of text, but with text then embedded in new locations in such a background. The slowness is due to the large amount of storing of new digital representations therein which are required using this method even though the background remains unchanged or changes infrequently, a process which can be accomplished more rapidly only with the use of expensive, faster memories, and possibly with the addition of further expensive auxiliary circuitry.

An alternative way to display textual characters over a graphics background on a display monitor is to store digital representations of the textual character pixels in a digital memory arrangement separate from that in which the digital representations of the graphics background pixels are kept. The digital representations of the textual characters are stored in the text memory in block portions thereof, each such text line block of memory containing a sufficient number of such representations to be coextensive with a horizontal line of text to be displayed on the monitor screen. Each such text line comprises a sequence of column positions to form that line, each of which can contain a textual character or other symbol. In the graphics memory, each screen horizontal pixel line will have a corresponding block of that memory containing a sufficient number of pixel digital representations to be coextensive with that line.

In such a system, a signal from some kind of controller for each horizontal pixel line on the display screen addresses the corresponding blocks in the text memory and in the graphics memory to select those digital representations in each containing the information which is to be used to form the textual character structure portion pixels and graphics background portion pixels for that line. A "character generator" circuit is used to store digital representations of forms of textual characters or other symbols which, in connection with signals from the controller, will provide digital representations of corresponding portions of textual character forms for each screen horizontal pixel line over which the textual character is to extend with the representations for each such portion to be used as digital representations of the corresponding pixels in its screen line. These representations of textual character portions for a screen line are combined with the corresponding background graphics pixels for that screen line in a "mixing" circuit which supplied this combination of digital representations to a video controller to operate the display monitor.

Thus, the textual characters on the screen have a rather limited dynamic relationship with respect to the graphics background. Since only blocks of these two memory arrangements can be addressed by the controller signal, textual characters can change position on the screen in only complete textual line increments up or down but not by screen pixel increments such as a single screen line change up or down.

As a result, there is a desire to provide a display monitor controller which gives a greater dynamic range in manipulating textual characters in respect to the graphics background. In addition, this greater manipulation capability is desired to be combined with a means of variably allocating portions of the screen to independent sources of commands which direct just what graphics background and just what textual characters are to occur on the corresponding allocated screen portion, or "window", on that screen. Further, conveniently changing textual character sizes is also desired.

SUMMARY OF THE INVENTION

The present invention provides a video display control system with a relative position memory in the signal path between a system controller and a foreground memory to permit changing the correspondence between a controller indicator signal, provided to indicate a selected screen line in a monitor that is to have the pixels therein specified, and that one of the blocks of foreground memory which will specify a portion of the forms of symbols to be displayed on such screen line. This indicator signal is also provided directly to a background memory to indicate which block of data therein is to control the provision of pixels for the graphics background to be displayed on that screen line. The relative position memory and the foreground memory control a symbol memory, and the outputs from the foreground memory, the symbol memory and the background memory are collected by a display controller capable, under the direction of these signals, of operating a display monitor. The relative position memory can also set the first column in a text line which is to display in a correspondingly allocated portion of the monitor screen so that text lines can be chosen to begin where desired therein.

BRIEF DESCRIPTION OF THE DRAWINGS

FIG. 6 shows a flow chart depicting further data retrieval operations in the system of FIG. 1, and FIG. 7 shows a flow chart depicting operations in the system of FIG. 1.

DETAILED DESCRIPTION OF THE PREFERRED EMBODIMENTS

Figure 1A:
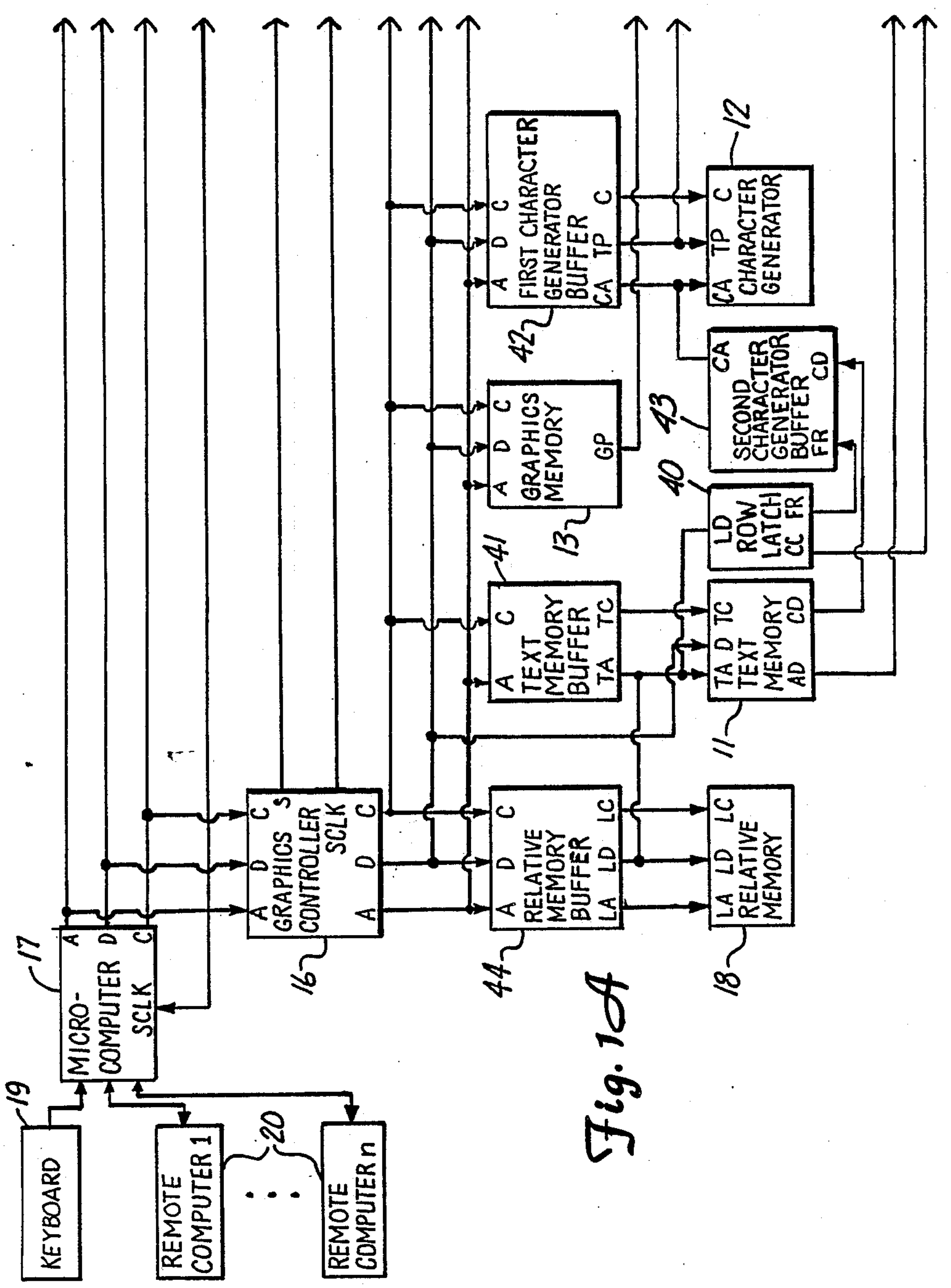
FIGS. 1A and 1B show a block diagram of a system embodying the present invention.
Figure 1B:
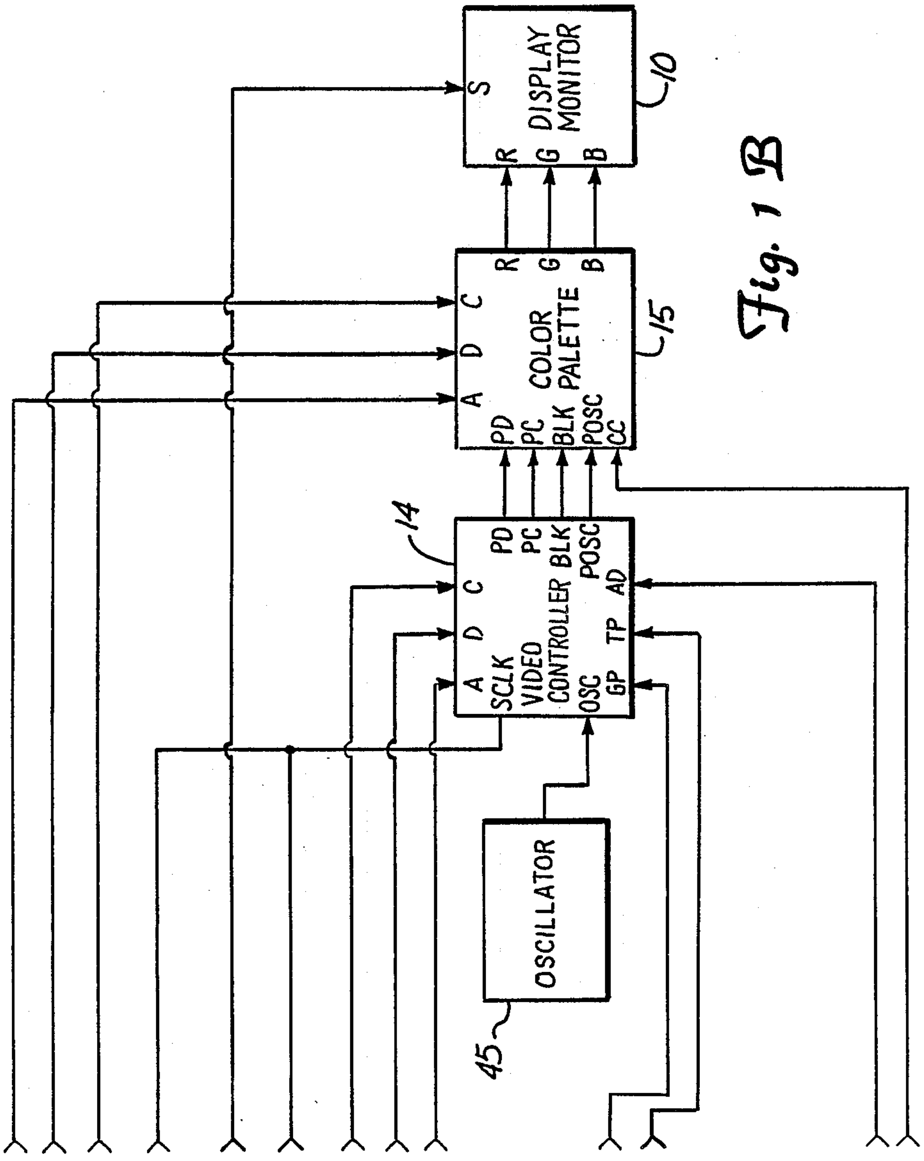

FIGS. 1A and 1B together show a block diagram of a video display control system for controlling the patterns of brightness and color of pixels with respect to one another in displays being presented on the screen of a display monitor, 10, in FIG. 1B. The various brightness and colors of selected pixels with respect to other pixels on the screen, as selectively changed over time, provides varying patterns in a screen display for observation by a system user.

Various parts of these changing patterns are provided from correspondingly changing digital representations of the screen pixel elements, current versions of such digital representations being stored in a text memory, 11, a character generator, 12, and a graphics memory, 13, in FIG. 1A. Text memory 11, for each line of text, contains information as to which textual characters or other symbols are to appear in each text line and certain specified characteristics or attributes thereof such as color, size, etc. Part of this information is provided to character generator 12 to specify which form for a character or symbol is to be provided for each character contained in the text line for which information is stored in text memory 11. Graphics memory 13 contains information as to background pattern portions which are to occur in each screen horizontal pixel line in the screen of display monitor 10 and which are expected to change relatively infrequently as compared to textual changes.

An indicator signal for each screen horizontal pixel line on the screen of display monitor 10 is sequentially provided to text memory Il (indirectly as will be further described below) and to graphic memory 13 (directly). This signal initiates the composition of pixel control signals to be provided to monitor 10 to direct the forming of pixel patterns in each line in the vertical sequence of screen horizontal pixel lines forming the display on that screen. That indicator signal serves as an address signal to cause selected data in each memory associated with a horizontal line to be provided at the respective data outputs of each. Part of that output data from text memory is provided to character generator 12 to specify the form of the character to be provided at each column position in the horizontal pixel line, the corresponding portion of this data for that line being provided at the outputs of character generator 12.

A video controller, 14, shown in FIG. 1B accepts signals from the data outputs of text memory 11, character generator 12 and graphics memory 13 for the first column position in the horizontal pixel line, and then proceeds to accept signals representing data from the outputs of these system blocks for the next column of the horizontal line, and so on until the signals representing each column in the horizontal pixel line being displayed have been acquired by video controller 14. As these signals at the outputs of text memory 11, character generator 12 and graphics memory 13 are acquired by video controller 14 sequentially for each column in a line, a corresponding set of signals is provided by controller 14 to a "color palette" circuit system, 15, in FIG. 1B. System 15 provides a color "look-up" table and suitable digital-to-analog converters to take the digital representations provided for each pixel in a line by video controller 14, based on the signals acquired by controller 14, and convert them to the corresponding red, green and blue voltage levels necessary for operating display monitor 10 in accord with EIA RS170 video standards. These signals are sent to display monitor 10 over three interconnections designated R,G and B in FIG. 1B at the exits and entrances therefor on these system blocks in that figure.

Video controller 14 provides digital representations of the information for each pixel in a screen horizontal pixel line from the information in the signals acquired from text memory 11, character generator 12 and graphics memory 13 on the following basis: the pixel result directed by the information in the corresponding digital representation from graphics memory 13 is displayed absent a signal from the corresponding digital representations acquired from text memory 11 directing instead the display of the pixel result contained in the information therefrom and in the corresponding digital representations from character generator 12. This signal from text memory 11 will be followed instead if present. Thus, the information in the digital representations kept in text memory 11 and character generator 12 provides the basis for the decision by video controller 14 as to whether the information for a particular pixel result: in a screen horizontal pixel line is to be that provided by graphics memory 13 or that provided by text memory 11 in conjunction with character generator 12.

The indirectness of the indicator signal to text memory 11 concerning the composition of a new display line in the vertical sequence of display lines is what gives the system of FIGS. 1A and 1B the desired ability to rapidly manipulate textual characters with respect to the graphics background. This indicator signal is provided by a graphics controller, 16, operating under the direction of a microcomputer, 17. Although, as indicated above, the line indicator signal from graphics controller 16 is provided directly to graphics memory 13, the effects of that same signal reach text memory 11 only through a relative position memory, or line list memory, 18. That is, the indicator signal provides a specific address to graphics memory 13 to have the digital representations stored in the memory block addressed thereafter provided at the outputs of that memory. The memory block therein so addressed contains information for the graphics background for the associated screen horizontal pixel line as previously stored there by microcomputer 17 and graphics controller 16. On the other hand, the address that is provided to text memory to cause any of the digital representations previously stored there by microcomputer 17 and graphics controller 16 to be provided at the outputs of that memory depends on what has been previously stored by microcomputer 17 and graphics controller 16 in line list memory 18. Thus, microcomputer 17, in response to commands thereto from a keyboard or a remote computer, can rapidly reposition textual characters provided on the screen of display monitor 10 by changing the contents of line list memory 18.

In detail, microcomputer 17 is based on a well known microprocessor manufactured by the Semiconductor Products Sector of Motorola, Inc. under the designation MC 6800. This microprocessor, together with appropriate memory and communication circuitry, form microcomputer 17 in a well known manner.

Figure 2:
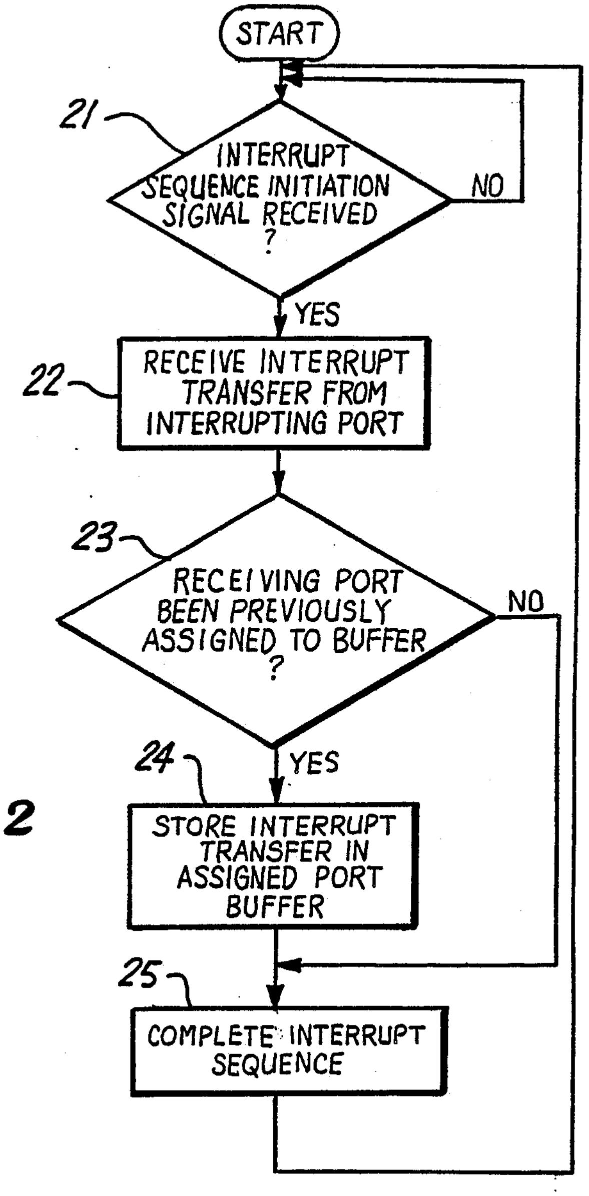
FIG. 2 shows a flow chart depicting data entry interrupt operations in the system of FIG. 1.

Two kinds of independent sources of commands or directives for microcomputer 17 are shown connected thereto in FIG. 1A, a keyboard, 19, and a plurality of remote computers, 20, numbered 1 to n, where n can take values up to 4. FIG. 2 shows a flow chart indicating the operation of microcomputer 17 with respect to such sources of commands.

An interrupt sequence appropriate for microcomputer 17 and command sources 19 and 20 is provided for permitting a source to interrupt operations of microcomputer 17 to transfer data thereto and, in the case of remote computers 20, to also obtain data therefrom. As can be seen in FIG. 2, for transmission interrupts, an initial decision diamond, 21, is provided to determine whether an initiation signal for initiating an interrupt sequence has been received by microcomputer 17. If not, this determination procedure is repeated until such an initiation signal is received. Upon its receipt, a serial transfer of data is received from the interrupting source at one of the display controller system data receiving ports as indicated in a block, 22.

A further decision diamond, 23, then determines whether the port which has received the data has been previously assigned to a buffer in memory for temporary storage of that data. Such a buffer is operated with that port and with a full screen if that port is the only one assigned to one of remote computers 20, or with one of the screen allocation portions, or "windows", if more than one such computer is involved so that one or more other ports are operated with a corresponding buffer and corresponding one of remote computers 20. Should the port have been assigned to such a buffer, the interrupt transfer data is placed in the buffer assigned thereto as indicated in a further block, 24. The absence of such an assignment leads to skipping such a storage of data and, in effect, the transmission of data in an interrupt sequence to an unassigned port is ignored. As can be seen, either the storage of the interrupt transfer data, or the ignoring thereof, leads to completing the interrupt sequence as indicated in a further block, 25, followed by the return to the initial step to await the occurrence of a further interrupt by one of independent command sources 19 or 20.

Figure 3:
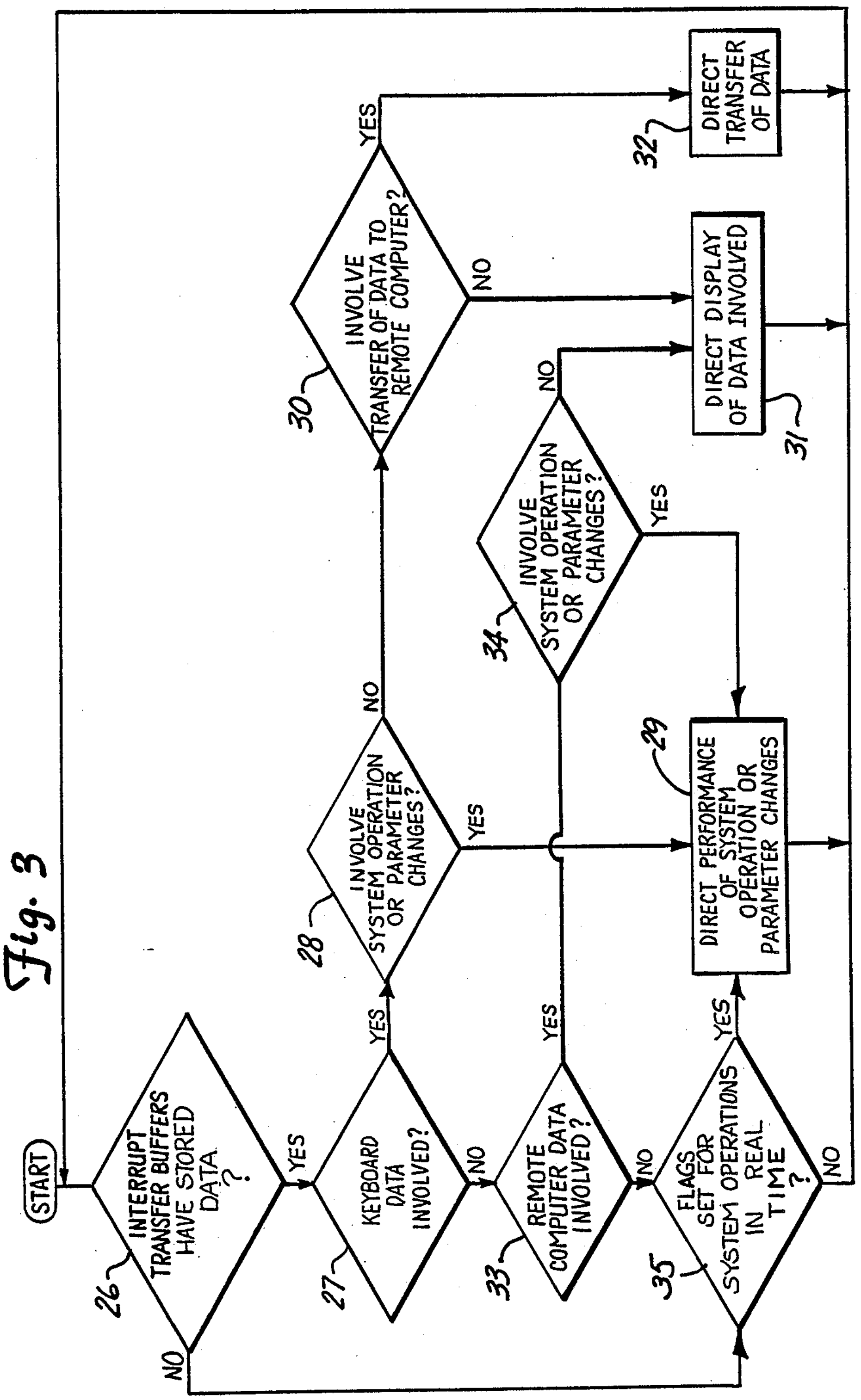
FIG. 3 shows a flow chart chart depicting data entry interrupt operations in the system of FIG. 1, and FIGS. 4A and 4B show a flow chart depicting data display window parameter setting operations in the system of FIG. 1, FIGS. 5A and 5B show a flow chart depicting data selection and retrieval operations in the system of FIG. 1.

Once an interrupt transfer of data has been received, FIG. 3 is a flow chart showing the general steps taken by microcomputer 17 in response. A first decision diamond, 26, is to determine whether such an interrupt transfer of data has been received. If not, the microcomputer jumps to a further decision diamond to determine if any systems operations flags have been set, as will be described below.

If such a transfer of data has been received for a port and its associated window, a further decision diamond, 27, is used to determine whether the data came from keyboard 19. If the data received is from keyboard 19, a further decision diamond, 28, is used to determine whether the data involves display monitor controller system operation or parameter changes. If so, microcomputer 17 directs the performance of such system operation and parameter changes as indicated in a further block, 29. Such changes in the performance of the system operation or parameters involve making changes to the state of the display monitor control system and might include, as examples, changing the text data entry line and column position, changing the host computer communications rate, or changing the size of the screen allocation or "window" associated with the port.

If the keyboard data does not involve such system operation or parameter changes, a further decision diamond, 30, is used to determine whether that keyboard data is to be transferred to a remote computer. If it is not to be so transferred, the data must then be intended to be directly displayed in the "window" which is active at the time the data was provided by the keyboard. This display is directed to occur by microcomputer 17, as indicated in a further block, 31, by storing the data in the text memory 11 or graphics memory 13. If this keyboard data was to be sent to a corresponding one of remote computers 20, microcomputer 17 provides for this as indicated in yet another block, 32.

If, however, keyboard data was not involved, another decision diamond, 33, is used to determine whether the data came from the remote computer associated with the window for which the sequence of steps in FIG. 3 is being performed. If it is data from the associated one of remote computers 20, again a decision diamond, 34, is used to determine whether the data involves system operation or parameter changes. If so, microcomputer 17 directs the performance of such changes as indicated in block 29. If the remote computer data is not provided for the making of changes in the display monitor system operations or parameters, the data must have been provided for display on the screen of the display monitor, and microcomputer 17 directs that this be done as seen in block 31 by storing it in text memory 11 or graphics memory 13.

Finally, there can be systems operations flags set that indicate to microcomputer 17 that action is required with respect to some or all of those operations of the display monitor control system which must be regularly checked on a timely basis to be kept correct. Such operations could include updating a display of time, updating status information, or updating progress of background printing. A decision as to whether this is involved is made in a further decision diamond, 35, in FIG. 3 which is reached from either of decision diamonds 26 or 33. If such a flag has been set, microcomputer 17 directs performance of the appropriate display system operation or parameter changes. If not, microcomputer 17 loops back to the beginning of the steps of FIG. 3 to await further data inputs to the buffers involved, or further settings of the flags involved, as it does upon the completion of directives in any of blocks 29, 31 or 32.

Returning to FIGS. 1A and 1B, microcomputer 17 interacts with the remaining portions of the display monitor control system on three separate buses. The primary address bus is marked A in FIGS. 1A and 1B at the primary points of entrance to, and exit from, those system blocks shown there to which this bus is connected. The primary control bus is marked with a C at the entrance and exit points of corresponding system blocks in FIGS. 1A and 1B to which it is connected, and the primary data bus is marked with a D at the entrance and exit points of those system blocks to which it is connected in FIGS. 1A and 1B.

These primary buses extend from microcomputer 17 directly to two system blocks in FIGS. 1A and 1B, color palette circuit block 15 and graphics controller block 16. The connections to color palette block 15 enable microcomputer 17 to change the colors resulting on the screen of display monitor 10 by causing different signals to appear at the outputs of block 15 for a given set of signals at the inputs thereof in a well known manner. The primary means by which microcomputer 17 directs operations of the display monitor control system is through its connections with graphics controller block 16.

Graphics controller 16 is, in effect, a special purpose microcomputer for providing drawings in the graphics background and for providing display monitor control. Microcomputer 17 manipulates textual characters or background graphics through passing instructions and data to graphics controller 6, thus permitting microcomputer 17 to attend to other operations while graphics controller 16 directs the carrying out of such manipulations. To do so, graphics controller 16 is programmed to perform such tasks as storing and retrieving data from selected memories, as directed by microcomputer 17, repositioning selected blocks of data within a selected memory, again as directed by microcomputer 17, and manipulating the bit map kept in graphics memory 13 to, in effect, permit digital representations of "drawn" configurations to be inserted therein.

Graphics controller 16, under direction of microcomputer 17, operates text memory 11, character generator 12, graphics memory 13 and relative, or line list, memory 18. Graphics controller 16 is a commercially available integrated circuit chip from Hitachi Ltd. under the designation HD 63484. Note that both microcomputer 17 and graphics controller 16 are operated on common system clock, designated SCLK, provided by a signal from video controller 14.

In directing operation of the display monitor control system, the primary command signal provided by graphics controller 16 is the indicator signal noted above which is formed as a sequence of horizontal pixel line numbers each corresponding to one of the vertical sequence of screen horizontal pixel lines in the raster sweep pattern on the screen of display monitor 10. Each such horizontal pixel line number provided by graphics controller 16 begins the transfer operation in the display monitor control system involving the transfer of the signals based on stored digital representations from graphics memory 13, and from text memory and character generator 12, to video controller 14, video controller 14 then generates from these signals the signals for the pixel pattern in the corresponding horizontal pixel line on the screen of display monitor 10. These generated signals then cause color palette circuit 15 to provide corresponding signals to display monitor 10 to provide the desired pixel result in that line.

Each horizontal pixel line number generated by graphics controller 16 is supplied to graphics memory 13 over primary address bus A and serves as an address to select the corresponding block of that memory that leads to the digital representations in that block of memory being provided in the output buffers thereof. These representations are acquired by video controller 14 for use in composing the associated screen horizontal pixel line, as will be described below. Concurrently, the same horizontal pixel line number provided by graphics controller 16 to graphics memory 13 is also supplied to relative memory 18 as will be described below. That pixel line number is, in effect, translated by what has previously been placed in relative memory 18 to select a block in text memory 11 to thereby determine which text line is to be associated with this particular horizontal pixel line on the screen of display monitor 10. In addition, the output elicited from relative memory 18 by graphics controller 16 in supplying a pixel line number thereto also indicates which text columns will be displayed, and further specifies which part of the text line selected from text memory 11 will be displayed on that particular pixel line, as text lines are each several pixel lines high. The resulting signals transferred to the outputs of text memory and character generator 12 are acquired by video controller 14. As indicated above, video controller 14 selects which parts of the data provided thereto by graphics memory 13, and by text memory 11 and character generator 12, are to be displayed vis-a-vis one another, this determination made by the directives contained in the signals provided at the outputs of text memory 11 and character generator 12, as will be described below.

In addition, a graphical cursor is provided by video controller 14 under the direction of commands from microcomputer 17 delivered to graphics controller 16 which are based on command signals from keyboard 19. Commands for the cursor are delivered by graphics controller 16 through adjusting the digital representations in graphics memory 13 which are read out by video controller 14, the system being arranged so that this cursor has a priority for display purposes over either other graphics figures or over textual characters. A typical form for the cursor is a "cross" formed by a highlighted horizontal pixel line and a highlighted vertical pixel line on the screen of display monitor 10.

Also, synchronization signals designated S in FIGS. 1A and 1B are delivered from graphics controller 16 to display monitor 10 to synchronize the horizontal and vertical sweeps of the electron guns in the cathode ray tube used in performing the raster scan. These signals determine the vertical and horizontal display size on the screen of display monitor 10.

Graphics memory 13 stores, the graphics background information provided thereto by microcomputer 17 and graphics controller 16 which is used to form the background in the screen display over which textual lines from text memory 11 and character generator 12 are provided, and which can be manipulated such as by scrolling the text lines over the background or by shifting a portion of the text lines to another position, etc. The graphics background shown in a horizontal line on the screen of display monitor 10 is determined by the digital representations entered in the corresponding block in graphics memory 13 at the time that the corresponding member of the sequence of horizontal pixel line numbers from graphics controller 16 is generated. The representations in a particular block of graphics memory 13, corresponding to a screen horizontal pixel line, are provided at the outputs thereof in response to the number of that line being provided by graphics controller 16.

Graphics memory 13 is organized on the basis of providing for storage of a matrix of digital representations of screen pixels so that there are 512 rows of these representations each stored in a corresponding block of memory 13 with each such row having 1024 representations provided for it sequentially thereacross. Each such digital representation of a pixel has four bits of memory to provide 16 possible colors therefor. This arrangement is provided by eight multiple port dynamic random access memory integrated circuit chips each configured to have 65,536 words of four bits each provided therein (64k×4). Each of these memory chips contains a 256 word bit shift register as an output buffer so that these words can be acquired serially four bits at a time. Graphics controller 16 stores, and video controller 14 retrieves, data from graphics memory 13 in 16-bit groups or four-word groups. Thus, there are four pixel representations in each such store or retrieval.

In response to the requirement for a graphics background change from keyboard 19 or one of remote computers 20, graphics controller 16 receives corresponding directives from microcomputer 17. In a change that provides what effectively appears as a line on the screen of display monitor 10, such drawing directives contain the information involving the matrix coordinates of the line, the desire for a line pattern, and the color the line is to take.

Graphics memory 13 is operated as though it were a discrete point cartesian coordinate graph (as indicated above, a matrix with each row corresponding to a screen horizontal pixel line), with display monitor 10 being able to display only 688 points for the graph abscissa axis and 500 points for the graph ordinate axis (i.e., a submatrix). Thus, there is a digital representation stored in graphics memory 13 for each point in this graph and new representations are stored or written therein to provide changes in the graphics background.

The output shift registers in the integrated circuit memory chips mentioned above are organized into an internal line buffer memory for graphics memory 13 which buffer memory receives the digital representations residing in that block of graphics memory 13 that has been selected by the presentation of a horizontal pixel line number thereto by graphics controller 16 in a retrieval, or reading, operation for this memory. This internal line buffer memory contains in sequence the digital representations obtained from that selected block for each sequential pixel in a horizontal line on the screen of display monitor 10 corresponding to that number provided by graphics controller 16.

To begin the display of the horizontal pixel line associated with a number provided by graphics controller 16, a control signal from video controller 14 is provided to graphics memory 13 to cause the pixel digital representations in the selected block of that memory to be transferred to the internal line buffer memory. All 1024 pixel digital representations in a horizontal pixel line are transferred to the internal line buffer memory at once. The pixel digital representations in sequence in that internal line buffer memory portion for the screen horizontal pixel line are sequentially acquired by video controller 14, over a transfer interconnection designated GP at the exit and entrance points of this interconnection in these system blocks in FIGS. 1A and 1B, as sequences of four words (one 16-bit word) of four bits. This acquisition starts with the four pixel digital representations for the far left side of that horizontal pixel line. Video controller 14 then sequentially transfers each four-bit pixel digital representation to color palette circuit 15 to provide the appropriate background pixel on the screen of display monitor 10, but only if information concurrently obtained from text memory 11 does not direct that a pixel be displayed based on information contained in text memory 11 and character generator 12 which will take priority over that information which was obtained from graphics memory 13.

If more than one screen allocation portion, or window, has been directed to be provided to accommodate more than one of remote computers 20, there is the possibility that a horizontal pixel line will have a portion thereof in each of two such windows. In these circumstances, two different blocks of graphics memory 13 will be selected to be the basis, in combination, upon which video controller 14 provides a sequence of output signals corresponding to a single horizontal pixel line in display 10. Graphics controller 16 will initiate the start of a horizontal pixel line again by providing a corresponding pixel line number, and graphics memory 13 will begin operating as described above in providing the pixel digital representations from that block of its memory selected by that pixel line number to its internal line buffer from which these representations will be sequentially acquired by video controller 14. However, graphics controller 16 will keep track of the sequence of signals from the buffer as to which signals have been acquired by video controller 14 in this acquisition sequence. Upon this acquiring by video controller 14 reaching the pixel digital representation beginning a new window, graphics controller 16 will note that occurrence and provide a new horizontal pixel line number. Because this new pixel line number is provided in the middle of a signal acquisition sequence by video controller 14, the new number will be understood by that controller to be selecting data from another block in graphics memory 13 which contains the information concerning the background display for the remaining portion of the same horizontal pixel line on the screen of display monitor 10. Thus, this second pixel line number from graphics controller 16 will cause the pixel digital representations in this other block of graphics memory 13 to be transferred at once to its internal line buffer replacing the previous contents thereof. Video controller 14 will continue acquiring sequentially those sequential pixel digital representation now occurring in the internal line buffer memory beginning at the same relative point in that sequence of representations that controller 14 was at in acquiring signals from the sequence of pixel digital representations provided under the previous pixel line number supplied by graphics controller 16.

The acquisition rate of pixel digital representations from the internal line buffer of graphics memory 13 by video controller 14 is set by controller 14 in accordance with the display rate set by graphics controller 16 for display monitor 10. Again, the display rate has been set to be in accord with a matrix display of pixels of dimension 688×500 pixels. This ratio of horizontal pixel extent to vertical pixel extent is chosen to be in accord with the physical width to height ratio of the screen of display monitor 10.

The graphics background shown on the screen of display monitor 10 is typically going to change relatively slowly, but the textual information provided thereover is often intended to change relatively rapidly, as indicated above. This textual information is obtained from text memory and character generator 12, also as indicated above, and is given priority in being displayed on the screen of display monitor 10 by video controller 14 over the display which would otherwise be generated in accord with the pixel digital representations stored in graphics memory 13.

Text memory 11 has the information specifying the textual characters to be displayed and the nature of the display thereof stored as digital representations in blocks of memory each sufficient to specify one line of such textual characters across the screen or an allocated screen portion, i.e. a window. Any such text line will extend vertically over a selected number of screen horizontal pixel lines, and so each textual character will have a portion thereof specified for each such screen horizontal pixel line over which it extends. That specification of the allocation of structural portions of each textual character over those screen horizontal pixel lines which are to display that character, and over the pixels which will be involved in each such line, is stored in character generator 12. Thus, text memory and character generator 12 are operated together in providing information concerning lines of textual characters to video controller 14.

A retrieval of information from text memory 11 is initiated by supplying a text line block number thereto specifying a text line block of memory therein that contains the digital representations that are to be provided to the outputs thereof. A retrieval of information from character generator 12 is initiated by providing a character structure row number thereto indicating which of the screen horizontal pixel row allocations involved in the stored character forms or other symbol forms is of current interest, as well as a character definition number thereto to specify which character or other symbol form stored therein is to have digital representations of its selected structural allocation provided at the outputs thereof.

Text memory 11 is organized also as a matrix with its rows formed by 256 text lines stored in a corresponding 256 text line blocks of memory with each text line having 256 columns provided for it sequentially thereacross. The first 162 columns are reserved for the purpose of the storing of a specification for a text character in each, but the maximum number of text columns which can be displayed on display monitor 10 is 132 such text columns based on the text character in each being five screen pixels wide giving a maximum of 660 such pixels across a line of text. Thus, the number of pixels across a line of text is less than the total number of pixels which can be displayed across a horizontal pixel line on the screen of display monitor 10 which, as noted previously, totals 688. The other 30 text columns in the 162 which can be displayed are used for borders for windows and to provide some reserve for possible future expansion. The text columns in excess of 162 not used for displaying characters on the screen of display monitor 10 are instead used to store other kinds of information associated with each text line for various purposes.

In each text line block of text memory 11, a text column portion thereof in which a single textual character can be specified has 24 bits of memory associated therewith to provide the necessary digital representation for specifying such a textual character. Thus, each sequential column in a text line has 24 bits of memory provided therefor, and these associated bits are divided into 10 character definition bits and 14 character attribute bits. The 10 character definition memory bits are used to select a character in a selected font stored in character generator 12 for the column in a text line for which these bits are provided. The associated 14 character attribute bits are used to select various attributes or characteristics for the textual character to be displayed in that column.

The character definition bits are stored in a section of text memory termed the character memory which is constructed using three multiple port dynamic random access memory integrated circuit chips each organized as 65,536 words of four bits each (64k×4). Similarly, the other section of text memory termed the attribute memory, has the corresponding attribute bits stored therein in three multiple port dynamic random access memory integrated circuit chips each organized as 65,536 words of four bits each (64k×4). Each of these integrated circuit chip memories contains an output shift register as an output buffer which can contain 256 words each of which can be retrieved serially four bits at a time.

The 14 character attribute bits for each column are further divided into subgroups on a task basis with four bits thereof specifying one of 16 colors for the background color to be provided in the column position in a text line in those areas thereof outside of the structural portions of the character itself. That is, the pixels in the several screen horizontal pixel lines which are not used to form the structure of the actual character in a column can have a separate color specified therefor.

These four bits are also those used by video controller 14 to discriminate in the providing of pixels in a screen horizontal pixel line portion extending across the associated column in a text line for those at locations therein absent the occurrence of any textual character structure as specified by character generator 12. Such pixels could be specified on the basis of choosing them to be formed either by (a) directives contained in the digital representations therefor in text memory 11 and character generator 12, versus choosing them to be formed by (b) directives contained in the digital representations therefor in graphics memory 13. If the value of these first four bits in the in the 14 character attribute bits associated with a column equals zero, video controller 14 will provide an output signal from that controller based on the four-bit digital representations obtained from graphics memory 13 by controller 14 for each of the pixels in the screen horizontal pixel line which appears in the column for which the character attribute bits are provided.

Another four bits of the 14 character attribute bits for a column specify one of 16 foreground colors which the screen horizontal line pixels are to take in those instances in which they are involved in the structure of a textual character occurring in that column. Screen horizontal line pixels which are part of textual character structures will be so specified by information provided by character generator 12, and such pixels will take the color specified by the second four bits in the 14 bit character attribute bits provided for that column. Video controller 14 will always direct the displaying of any textual character structural portions specified thereto by character generator 12 by making the corresponding pixels take the foreground color wherever specified so that textual characters always take priority over either the background color set by the first four bits of the 14 character definition bits or over any representations for pixels provided by graphics memory 13. In the absence of character generator 12 indicating that a pixel is to be a part of a textual character, the above-described discrimination test by video controller 14 is applied to the first four bits of the character attribute memory bits for a column to determine whether the textual background color will occur for those pixels in that column or whether they will be displayed as directed by the information acquired from graphics memory 13 therefor.

Another of the text character attribute bits specifies whether the column is to have an underline provided with it. If underlining is specified by the operator at keyboard 19 or by one of remote computers 20, video controller 14 will also receive a further bit from a row latch, 40, as will be described below. In this situation, video controller 14 will place all of the screen horizontal line pixels in the foreground color, and this will occur only for a screen horizontal pixel line below the displayed textual character in the column to thus represent an underline of that textual character.

A further two bits of the 14 text character attribute bits is used to select a text character width, which can be five, six, eight or ten screen horizontal graphic line pixels with the choices of wider characters, of course, reducing the number of columns in a text line that can be displayed. Another bit in the 14 text character attribute bits permits doubling this textual character width.

Finally, two bits of the 14 text character attribute bits are used to block the forming of any character structure portion in, and to control the colors of, columns which can be selected for use as part of a border about a window, or allocated screen portion, which may occur through that column for which the 14 text character definition bits are provided. Each such allocated screen portion or window requires a top, bottom, right and left border. As indicated, these borders are created through microcomputer 17 and graphics controller 16, based on border commands from keyboard 19 or the appropriate one of remote computers 20, by the use of appropriate textual characters in the situations of right and left side borders The right and left window borders for each portion of a text line in a text window are created by changing the right-most and left-most text columns associated with that window from the assigned text character originally provided therefor by microcomputer 17, as required thereof by inputs from keyboard 19 or the corresponding one of remote computers 20, to a display in those text columns which matches the border design previously chosen for use on the display monitor screen in configuring this display monitor control system. Therefore, the 14 text character attribute bits for each of those border text columns are set by microcomputer 17 to specify that the previously chosen border color be displayed, and the ten text character definition bits for each of those border columns are set to specify that textual character display that represents a blank.

The top border line for a window is created by microcomputer 17 by directing that all of the text columns of that portion of the top text line in such a window be border text columns through providing a border text line in a block of text line memory 11 which is selected for display in those screen horizontal pixel columns portions in which that border is to appear. The bottom border of such a window, which is a Status Line for that window, is created in the same manner as is the top border except that microcomputer 17 directs through graphics controller 16 the additional display therein of status information associated with that window in textual characters in the text columns in the bottom text line forming the border of that window.

Once the specifications are stored for textual characters in columns of a text line by microcomputer 17 through graphics controller 16 in a text line block of text memory textual characters will be displayed only if the commands from keyboard 19 or the associated one of remote computers 20 directs microcomputer 17 to cause the display of the text line column in which such textual characters are located. The number of text lines which can be displayed in the window associated therewith is limited by the height of that window. As will be seen below, the height of the window is set by commands from keyboard 19 and the associated one of remote computers 20 to microcomputer 17 which causes graphics controller 16 to set the height of the text window by appropriate insertions into relative memory 18. Text lines associated with a window which are not within the scope of the insertions in relative memory 18 will not be displayed.

In those text lines associated with a window which are being displayed in that window, the number of text columns which will be displayed in each of those lines will be determined by the width of the text window. Text columns in text lines which are being displayed but which are not inside the text window will not have signals from the digital representations thereof be acquired by video controller 14 because of the actions taken by graphics controller 16 in connection with maintaining the window, and so those text columns will not be displayed on the screen of display monitor 10. The particular portions of text lines which will be seen in a window if the entire text line is not seen will be determined by appropriate insertions by graphics controller 16 into relative memory 18 under the direction of microcomputer 17 as will be further described below.

As will also be described below, relative memory 18 makes conveniently possible either a full screen being associated with one of remote computers 20 or up to four allocations of screen area to each be associated with one of remote computers 20. That is, there is a window for each one of up to four of remote computers 20 with the active one of those also receiving inputs from keyboard 19. The 256 text line blocks in text memory 11 are allocated among these windows. Upon supplying power to the display monitor control system of FIGS. 1A and 1B, typically 24 lines are preprogrammed to be assigned to the first text window which can thereafter be changed.

A Line Number Table is maintained in text memory for each of the four possible windows. Conveniently, the first four lines of text memory 11 are used for the four Line Number Tables required by these four possible windows with each Line Number Table containing one text line block number entry for each text line memory block which is assigned by microcomputer 17 to the text window associated with that line. The text line block numbers thus range from four to 255 and are kept there by microcomputer 17 in the order they are desired to be displayed on the screen of monitor 10, from the top of the window associated with the Line Number Table in which these numbers are stored to the bottom of that window. As will be seen below, this ordering of text line block numbers in a corresponding Line Number Table is determinative of the order in which the associated text lines are displayed in the associated window. The text line block numbers may not be in numerical order in the Line Number Table to which they are assigned if manipulations of the screen display of textual lines (to be described below) have occurred leading to repositioning of the text lines from their original screen position.

The text line block numbers allocated to a window and its associated Line Number Table are initially stored sequentially in numerical order by microcomputer 17 through graphics controller 16 into the associated text line block assigned to that window in one of the first four text line blocks of text memory 11. The text line block in which a Line Number Table is formed has the allocated text line block numbers for its window placed therein starting in the column zero position of that Line Number Table text line block and continues in column position order.

Thus, each Line Number Table is a list means in which microcomputer 17 keeps track of the sequential order of text line blocks that are to be displayed in the associated window on the screen of display monitor 10 After the first window has had 24 text line memory blocks assigned to it by microcomputer 17 following the supplying of power to the display monitor control system, the second window has allocated to it a group of sequential text line memory blocks by microcomputer 17 in a similar manner. Thus, a corresponding Line Number Table with the numbers of these blocks established for this second window by microcomputer 17 is also provided in the second text line block of the text memory. This also occurs for each of the remaining two possible windows.

Of course, the operator is free to change the size of any or all of the windows even to the extent of reducing the text line memory blocks assigned to a window to zero. If, on the other hand, the operator selects more text lines for the windows than are currently available, the system reduces the number of lines which it assigns to the last window from that number which the operator had indicated is desired.

Entering text characters for lines in display 10 from keyboard 19, or the associated one of remote computers 20, as a 24-bit digital representations of the information for each such character into those text line blocks of text memory 11 allocated to the window chosen for such entry is kept track of in terms of text line entry numbers and text entry column numbers by microcomputer 17. At the activation of a window, the initial text entry line is numbered zero as is the initial text entry column. The entry of a text character will be at that location initially, unless the operator commands otherwise, and the entry of the next textual character is advanced one further column position by microcomputer 17. There are several commands by which an operator of keyboard 19 or the associated one of remote computers 20 can direct microcomputer 17 to choose other text entry lines or columns, and in some circumstances microcomputer 17 directs such changes based on its internal program.

Microcomputer 17 keeps track of the text entry line numbers through their relation to the Line Number Table associated with the window for which the text entries are provided. The first position in that Line Number Table corresponds to text entry line zero, the second position in the Line Number Table corresponds to text entry line one, etc. The text line block number which appears at that position in the Line Number Table, denoting which text line block of text memory 11 that is currently being associated with that Line Number Table position, is the text line block of text memory 11 in which the text entries under the corresponding text entry line number will be stored. That is, the text line block number in that position of the Line Number Table corresponding to the text entry line currently having textual character manipulations performed therein denotes the text line block of text memory 11 which will receive the digital representations following from such textual character manipulations made by the operator of keyboard 19 or supplied by the associated one of remote computers 20.

Thus, a textual character entry in a selected text entry line by an operator of keyboard 19, or by the associated one of remote computers 20, results in appropriate digital signals being received by microcomputer 17. Microcomputer 17, in turn, directs graphics controller 16 to provide appropriate digital representations in that text line block of text memory 11 which has its corresponding text line block number located in the position corresponding to the text entry line of that Line Number Table associated with the window for which the textual character addition is being made. Graphics controller 16 places the appropriate address signals on the address bus A and the appropriate command signals on the command bus C which are transmitted to a text memory buffer, 41. From there, these signals are effectively sent to text memory 11 across the text address bus, designated TA in FIG. 1A, at its entrance and exit points on these system blocks, and across the text control bus, designated TC, at its exit and entrance points on these system blocks. Graphics controller 16 places the digital representations themselves for such a textual character directly on the primary data bus D, and the address, commands and data signals are synchronized to reach text memory 11 concurrently to cause the storage of the digital representations representing the textual character addition in the proper text line block of that memory. Text line memory buffer 41 is used to prevent collisions between data and addresses due to data provided from relative memory 18 on the text address bus TA, which will be described below, and from contending sets of commands which could appear on the primary command bus C.

Graphics controller 16 is programmed so that if the top textual character line in a window is deleted by an operator at keyboard 19, or by the associated one of remote computers 20, directives emanate from graphics controller 16 to cause all of the text line block numbers in the associated Line Number Table to move one position toward the beginning of that table. The last position of that table thereby becomes vacated and the text line block number for the text line block of memory, which just had therein the digital representations concerning the textual characters that were deleted, is entered in the last assigned number position of the Line Number Table. The window thus has all blank columns in the corresponding last line thereof, and so additional textual characters can be entered in the text entry line associated with this last position in the corresponding Line Number Table, and the digital representations for such added textual characters will go into the text line block of text memory 11 which had previously carried the digital representations for the line which was deleted. This, then, is an example of how the Line Number Table associated with the window is used to keep track of text entry lines insofar as to where the corresponding digital representations concerning entered textual characters are stored in text memory 11, and of how the text line block numbers in the Table get out of numerical order.

Character generator 12 contains digital representations of the forms of textual characters and other symbols typically in multiple fonts and possibly in multiple languages. Each such textual character form is stored in the character generator memory as 32 rows of character structure words. Each structure word contains 16 memory bits. The 32 rows of 16-bit words for a textual character represent the form of that character on the basis of a mapping of the geometrical distribution of the character structure in a $32\times16$ position matrix to a corresponding distribution of logic values in a $32\times16$ memory cell matrix. Background portions of that memory cell matrix array corresponding to background locations in the character position matrix which are not within the pattern of the structure of the textual character have a logical value zero stored therein. Foreground portions of those memory cells in the array corresponding to those locations in the character position matrix over which the geometrical structure of the textual character involved occurs have a logical value of one stored therein. Each memory cell matrix row corresponds to that portion of a screen horizontal pixel line over which the character is to be displayed and represents that portion of the character allocated to that line.

As indicated above, video controller 14 converts a structural word, or set of row bits, from such arrays in character generator 12 for a textual character into signals representing pixels to be displayed as a part of a screen horizontal line of pixels with such a pixel to have the foreground color specified by the four text character attribute bits associated therewith if a bit in the structural word has a logical value of one. If, on the other hand, the structural word has a logical value of zero, controller alternatively selects the background color specified by the associated four text character attribute bits (or what is specified by the corresponding directives from graphics memory 13 in some instances).

The structural word bits from character generator 12 are used to specify "text pixels" only half the horizontal size of screen pixels but equal in vertical size thereto. Though these text pixels are almost always used in pairs in a screen horizontal pixel line, this arrangement allows shifting horizontally half a screen pixel to smooth out characters and avoid some of the "staircase" effect. Controller 14 and color palette circuit 15 can easily control display monitor 10 to operate on only half screen pixel increments. Only a portion of the 16 bits within a structural word are needed if the textual character size for a text column is less than 16 text pixels wide, and only a portion of the 32 structural words associated with the textual character are needed if the textual character in the column is less than 32 pixels high.

Text memory 11, as described above, supplies from its output buffer to character generator 12 (through a buffer to be described below) signals representing ten-bit text character definitions each of which can select one of the textual characters stored in the memory of character generator 12. As will be seen below, a structural word corresponding to a row in an array of 32 such structural words that are used to define a textual character and which corresponds to the pixels displayed in a text column in a screen horizontal pixel line on the screen of display monitor 10, is selected by a structural word row number stored in row latch 40. Signals corresponding thereto are supplied by row latch 40 to character generator 12 (through this same buffer).

Character generator 12 is implemented through use of two static random access memory integrated circuit chips. These chips are each organized as 32,768 words by each of eight bits ($32k\times8$).

Textual character forms stored in the memory of character generator 12 are selected and stored there by an operator at keyboard 19, or by one of said remote computers 20 providing appropriate signals to microcomputer 17. Microcomputer 17 directs graphics controller 16 to store the appropriate digital representations in the memory of character generator 12 through a first character generator buffer, 42, in conjunction with a second character generator buffer, 43. Buffer 42 is provided so that storage of altered fonts can be effected in character generator 12, even though it is being regularly used in operations of the display monitor control system, by providing new representations thereto for different character structures that are received from graphics controller 16 and microcomputer 17. These new representations are provided during times video controller 15 is not providing signals for forming a horizontal screen pixel line, i.e. during retrace periods.

Second character generator buffer 43 receives the 10-bit text character definitions from text memory 11 across an interconnection designated CD at its exit and entrance in these system blocks in FIG. 1A each of which can select one of the textual characters stored in generator 12. Second character generator buffer 43 also receives the 5-bit structure row number from row latch 40 across another interconnection designated FR at its exit and entrance in these system blocks in FIG. 1A. These text character definitions and structure row numbers are provided by character generator buffer 43 to character generator 12 over a character generator address bus designated CA at the exit and entrance of these system blocks in FIG. 1A for each text column in a horizontal screen pixel line. During the retrace times, buffer 43 keeps data supplied thereto off character generator 12 address bus CA so that data can be provided to that generator from buffer 42 without interference.

As indicated above in connection with graphics memory 13, the displaying of a horizontal pixel line on the screen of display monitor 10 is begun with signals provided from graphics controller 16 indicating the numbers of the horizontal pixel lines to be displayed, and with control signals being provided by video controller 14 being supplied to graphics memory 13 and, additionally, being supplied to text memory 11. However, the horizontal pixel line number supplied by graphics controller 16 is not supplied to text memory 11 nor to character generator 12, but rather is supplied to relative memory 18 through a relative memory buffer, 44, as the basis for directing retrieval of selected data from text memory 11 and character generator 12. Thus, transferring textual character data from these latter two system blocks requires appropriate signals being supplied by relative memory 18 based on the signals supplied thereto representing the horizontal pixel line number supplied by graphics controller 16.

The succession of horizontal pixel line numbers supplied by graphics controller 16, each to initiate displaying a pattern of pixels in the corresponding horizontal pixel line on the screen of display monitor 10, are provided to relative memory buffer 44 through primary address bus A. From there, they reach relative memory 18 over a line list address bus designated LA at the exit and entrance points therefor in these two system blocks. Each horizontal pixel line number in the succession thereof then serves to direct selected data kept in relative memory 18 to appear on a line list data bus designated LD at the exit and entrance therefor in these same two system blocks. Also, data transmitted by graphics controller 16 on primary data bus D to relative memory buffer 44 is also passed to relative memory 18 on line list data bus LD. Various command signals are also passed from graphics controller 16 over primary control bus C to relative memory buffer 44 and then transmitted to relative memory 18 over a line list control bus designated LC at the exit and entrance therefor in these last two system blocks.

Relative memory buffer 44 serves to permit data in relative memory 18 to be changed during operations, but prevents such changes occurring during retrieval operations involving memory 18. Data from relative memory 18 is supplied to text address bus TA in selecting a text line block of memory from text memory 11, and the presence of buffers prevent any collisions between such data and any other signals on these buses. Thus, data can be changed in relative memory 18, and output data from relative memory 18 can be transferred to text memory 11 to address text line blocks therein, without interferences which could disrupt operation of the display monitor control system.

The primary data stored in relative memory 18 by microcomputer 17, accomplished by microcomputer 17 directing graphics controller 16 to perform such storage, is an altered version of those portions of the Line Number Tables kept in text memory 11. The portions of each of the Tables stored in relative memory 18 are those portions having the text line block numbers therein designating those corresponding text line blocks of memory 11 having the digital representations stored therein that are to direct the textual characters specified thereby to be displayed in the window on the screen of display monitor 10 associated with that Table. Any particular text line block number in a Line Number Table signifying a text line that is to display on the screen in the associated window is repeated in relative memory 18 in each of the storage locations therein which are addressed by one of those successive pixel line numbers supplied from graphics controller 16 designating corresponding successive horizontal pixel lines on the screen of display monitor 10 over which that textual character line is to extend. As a result of this capability, textual characters can be formed of any desired height in the corresponding window of the screen in display monitor 10 up to 32 horizontal pixel lines in total height so long as the comparably sized textual character has been stored in character generator 12. The present display monitor control system is typically selected in two different heights for the textual characters to be displayed thereby, ten horizontal pixel lines of height and 15 horizontal pixel lines of height, although microcomputer 17 could be caused to alter the choice of possible textual character heights in the character forms stored in character generator 12 by suitable directives transmitted thereto through character generator buffer 42.

Thus, the receipt of a horizontal pixel line number by relative memory 18 from graphics controller 16 will provide a text line block number at the output of memory 18 for transmittal over data bus LD and address bus TA to text memory 11 to specify the text line block therein containing digital representations directing that the textual character form specified thereby be displayed in part over the corresponding horizontal pixel line on the screen of display monitor 10. If the proper part of the textual character structures are to display on that horizontal pixel line, the character structure row number for the selected text character form must also be specified. Thus, each text line block number stored in relative memory 18, and all repetitions thereof defining text character height, have a corresponding character structure row number stored in one-to-one correspondence therewith by microcomputer 17 through graphics controller 16.

As a result, the provision of a horizontal pixel line number by graphics controller 16 to relative memory 18 causes both the corresponding text line block number and the corresponding character structure row number to be provided together at the output thereof on data bus LD. Each text line block number will be repeated the number of times necessary for the selected height of a textual character in that line, as described above, but each repetition thereof will carry with it a character structure row number which is one count greater than that provided with the preceding listing of that same text line block number. If the textual characters are selected to be ten horizontal pixel lines high, for instance, a text line block number will be repeated ten times, each of which will correspond to a different successive horizontal pixel line number supplied by graphics controller 16. The associated character structure row number will be zero for the first occurrence of that text line block number, and then the successive character structure row numbers associated with each successive repetition of the block number will increase one count with each such repetition until row number nine is reached.

Although the text line block number is placed on line list data bus LD for transmittal to text memory 11 simultaneously with the associated character structure row number by providing to memory 18 of the corresponding horizontal pixel line number from graphics controller 16, that character structure row number is transmitted instead on this bus to row latch 40. There it is stored for the entire time taken for arranging the displaying of pixels on the corresponding horizontal pixel line on the screen of display monitor 10 to the extent it is in the associated window. Row latch 40 is thus able to continue to present this information to character generator 12 during the arranging for the display of pixels in that horizontal pixel line even though the original information provided by relative memory 18 on line list data bus LD has been removed to give microcomputer 17 the opportunity to change the data which has been stored in relative memory 18.

This capability to permit microcomputer 17 to rapidly change the data concerning text line block numbers, character row structure numbers, etc. stored in relative memory 18 through graphics controller 16 and relative memory buffer 44 is necessary to permit rapid changes in positioning of textual lines in a window with respect to the graphics background. Typical of such manipulation is the vertical repositioning of text lines in the window on the screen of display monitor 10, a manipulation termed "scrolling" if the textual lines move upward with the top lines going off the screen or the textual lines move downward with the bottom lines going off the screen. This is easily accomplished in the monitor display control system of FIGS. 1A and 1B since the Line Number Table for a window keeps the text line block numbers therein in the order of the text entry lines the contents of which are stored in the corresponding memory blocks of text memory 11. Since the text line blocks of text memory 11 which specify the text lines that display in the associated window are just those having text line block numbers that are copied into the portion of relative memory 18 for that window with suitable repetitions of each to define text character heights on the screen, the pertinent Line Number Table and associated portion of relative memory 18 can be changed jointly very quickly and conveniently.

Scrolling is done by moving the text line block numbers in the pertinent Line Number Table to a corresponding lower or higher position in the Table sequentially, and moving the corresponding repeated text line numbers in relative memory 18 to positions associated with horizontal pixel line numbers which correspond to horizontal pixel lines which are higher or lower on the screen. If the scrolling is to be in "jumps" insofar as moving upward and downward an entire text line in the time between one screen vertical scan and the next, the text line block numbers in the Line Number Table move one position upward or downward for each desired jump. If the textual characters have been selected to be ten pixel lines high, the ten repetitions of each of the text line block numbers in relative memory 18 move correspondingly ten horizontal pixel line number positions up or down in that memory in that same time between one vertical scan of the screen of display monitor 10 and the next.

If the entire set of text line memory blocks assigned to the window are on display, either the top textual line in an upward scroll or the bottom textual line in a downward scroll is deleted at each jump, and an open position occurs at the opposite end of the textual lines. Otherwise, the textual lines merely disappear from view but can be recalled to view by scrolling in the opposite direction.

Rather than scrolling an entire text line in a single jump on the screen, scrolling can alternatively be accomplished smoothly by changing the vertical position of a text line from one text line position on the screen to the next through a series of incremental screen height changes each equal in height to a horizontal pixel line. That is, the ten repetitions of a text line block number over ten successive horizontal pixel row numbers in relative memory 18 are moved just one horizontal pixel line number between one vertical scan and the next, rather than ten horizontal pixel line numbers between one screen vertical scan and the next as in a jump scroll, with this action repeated nine more times during nine more vertical scans.

Thus, a text line in the window on the screen of display monitor 10 moves upward or downward, as selected, one horizontal pixel line for each vertical scan giving the appearance of a smoothly adjusting upward or downward positioning of each text line displayed in that window. Typically, scrolling is required to be in total equal to one textual line height so that no partial textual figures appear on the screen. Operation in that manner makes changing the corresponding Line Number Table easily done, as the text line block numbers therein each move a corresponding one position in the Table and hold that position while the ten repetitions of the text line block number in relative memory 18 complete their repositioning with respect to the horizontal text line numbers to thereby effect a smooth scroll of each text line to its new position. As will be seen below, these text line manipulations can be done independently for the text lines in each window displayed on the screen of display monitor 10.

Such text line manipulations as scrolling affect only those text lines having characters displayed therein. Each window has representations specifying a number of other kinds of text lines stored in text memory in association therewith including a blank scroll line to which text can move during a scrolling operation, an ordinary blank line for filling in those lines in the window in which textual characters have not been provided by the operator at keyboard 19 or the associated one of remote computers 20, and two kinds of lines already described. These are a border line for the top border of a window and a status line for the bottom border of the window. These other kinds of text lines are eliminated by microcomputer 17 and graphics controller 16 from being involved in many text line manipulations.

Vertical scrolling as just described permits seeing other text lines displayed in a window on the screen of display monitor 10 that are associated with that window but not currently displayed. Thus, the text lines associated with the window are those in the text line blocks of text memory 11 for which the associated text line block numbers are kept in the Line Number Table associated with that window. Some of these may not be displayed even though associated with the window because of the constrictions on the vertical height of the window, i.e. are eliminated from being listed in relative memory 18. However, the window may also have horizontal restrictions on its width so that not all of any given textual line will be displayed in that window either.

Thus, side-to-side scrolling is also desired, and this is provided by a further block of information stored in relative memory 18 for each horizontal pixel line number, and so for each text line block number and character structure row number in one-to-one correspondence therewith. This additional block of information provided for each screen horizontal pixel line number is the starting column number which indicates which column in a text line will be the first to be displayed on the left side of the associated window on the screen of display monitor 10. Thus, for every block of relative memory 18 which is addressed by a particular horizontal pixel line number, there will be stored in that block (a) a text line block number indicating which of text line blocks of text memory 11 is to specify what is to be displayed on the screen horizontal pixel line designated by that horizontal pixel line number, (b) the character structure row number indicating which row of textual character forms is to be displayed in that horizontal pixel line, and (c) the starting column number indicating which of the columns in the selected textual line is to first appear on the left side of the window, all of which will be provided at the outputs of relative memory 18 after being so addressed.

Microcomputer 17, through changing starting column numbers for a window by directing graphics controller 16 to transmit the appropriate new starting column number to relative memory 18 through relative memory buffer 44 in appropriate synchronism with vertical scans of the screen of display monitor 10, can in effect provide side-to-side scrolling which is either "jump" scrolling or smooth scrolling as desired by an operator at keyboard 19 or by a directive from an associated one of remote computers 20. The starting number actually specifies to text memory 11 the amount of cyclic rotation to be undergone by the column digital representations for a text line stored in a text line block of text memory 11 before being presented at the outputs thereof after being addressed by a text line block number from relative memory 18.

Providing a top window and a bottom window on the screen of display monitor 10 is easily done through appropriate management of the data stored in relative memory 18 again under the direction of microcomputer 17. Since the horizontal pixel line numbers provide a vertical position index for the screen of display monitor 10, a text line block number for that text line block of text memory 11 storing the status line for the upper window can be inserted with the appropriate number of repetitions in the memory blocks defined by any chosen successive set of horizontal pixel line numbers in relative memory 18. This effectively divides the screen of display monitor 10 into an upper window and a lower window each having a fraction of the horizontal pixel line therein. Those horizontal pixel line numbers which are smaller than the numbers of those designating the memory blocks in relative memory 18 containing the designations of the memory blocks of text memory 11 in which the upper window status line information is stored are assigned to the upper window. That is, such horizontal pixel line numbers will address blocks of relative memory 18 which have stored therein those text line block numbers from the Line Number Table associated with that upper window. Those blocks of memory 18 thus contain the information about the text line blocks of text memory 11 that are desired to specify what is to be displayed in that upper window along with the associated starting column numbers and character structure row numbers.

Similarly, those horizontal pixel line numbers which are greater than those which address blocks of memory in relative memory 18 that contain the information for the upper window status line will be involved with the lower window. Those horizontal pixel line numbers will be used to address blocks of relative memory 18 which will have stored therein text line block numbers containing the information concerning the text line blocks of text memory 11 containing the information specifying the text lines that are desired to be displayed in the lower window along with the associated starting column numbers and character structure row numbers. Thus, the way that information is stored in relative memory 18, and the manner of addressing that information through horizontal pixel row line numbers that also serve as a vertical position index for the screen of display monitor 10, provides an easy way of allocating portions of the screen of display monitor 10 between an upper and a lower window. A similar splitting of blocks of memory in graphics memory 13 designated by the horizontal pixel row numbers from graphics controller 16 into two corresponding groups (without regard to border displays) permits the graphics backgrounds in these upper and lower windows to also be independently manipulated.

Providing a left side and a right side window on the screen of display monitor 10 presents additional considerations since the positions of the text lines to be displayed in one window are desired to be manipulated independently of those text lines that are desired to be displayed in the other. This conflicts with the necessity that the text lines in the left window must appear on the left side of the same horizontal pixel lines in the screen which extend into the right window where different text lines are to appear. If the text line block of text memory 11 containing the digital representations specifying the text lines that are to display in the left window on the screen also contains the digital representations specifying the text lines which are to appear in the right window on the screen, vertically repositioning a text line in one of these windows would force the same repositioning of the text line in the other window even though no such repositioning of text lines is desired in this other window.

The monitor display control system of FIGS. 1A and 1B avoids this result by storing two alternative sets of data in relative memory 18 for each of the horizontal pixel lines of the screen of display monitor 10 with one of these sets to be used for each portion of that pixel line in a different side-by-side window. Thus, each horizontal pixel line number is associated with a first text line block number and a second one, and each of these has a one-to-one correspondence with its own associated character structure row number and starting column number. Each of the first and second text line block numbers for a horizontal pixel line number has a corresponding text line block in text memory 11 in which is stored digital representations for specifying text lines to be displayed on the screen of display monitor 10.

Similarly, graphics memory 13 stores two sets of digital representations defining the background pixel patterns for each horizontal pixel line on the screen of display 10 and, as indicated above, provides in its output internal line buffer the graphics background digital representations for a horizontal pixel line from one set until the border between the right and left windows is reached in an acquisition of output signals therefrom by video controller 14. Graphics controller 16, upon noting that the window border has been reached, directs substituting digital representations from the other set thereof in its internal output buffer for that same horizontal pixel line which are then acquired by digital controller 14 for the remainder of that line.

The similar provisions in text memory 11 permit independent manipulation of the text lines in a window at the side of another window without regard for manipulations of the text lines in that other window. Video controller 14 must here also acquire signals from the outputs of text memory 11 based on the digital representations contained in the text line block of text memory 11 associated with the first text line block number for a particular horizontal pixel line number until the window border is reached, and then from the text line block associated with the second text line block number. Since different text line blocks are accessed in text memory 11 for each window, information can be changed in each of these blocks without affecting that which is stored in the other. Further, information stored in these blocks can be provided for purposes of specifying a display in a particular window without any affect on the information which other blocks provide for specifying a display in another window.

The same arrangement for defining upper and lower windows on the screen of display monitor 10 described above can be used in connection with the data in relative memory 18 that is stored for one set of horizontal pixel line numbers. Similarly, that arrangement can also be used with the second set of data stored for those same horizontal pixel line numbers. Thus, the top and bottom windows on both the left and right sides of the display can also be operated independently to thereby permit four screen allocation portions or windows on the screen of display monitor 10, each of which has independently manipulable textual lines and graphics backgrounds.

Text memory 11, in providing these capabilities, has the output shift registers in the integrated circuit memory chips therefor organized into an output internal line buffer as described above. Again, after the provision of a horizontal pixel line number from graphics controller 16 to relative memory 18 through relative memory buffer 44, video controller 14 provides a control signal to text memory 11. This signal causes the data, selected from text memory 11 at the address supplied by the text line block number provided by relative memory 18 upon its having received such a horizontal pixel line number, to thereby form an entire 256 column text line by it being transferred in parallel from the addressed text line block in text memory 11 to the internal line buffer thereof. There, the 256 columns are stored as 256 words each of 24 bits.

These text columns, or text column words, are acquired sequentially by video controller 14 and character generator 12. The data provided by relative memory 18 also include the character structure row number being provided to row latch 40 and starting column number indicating the cyclic shift desired in the digital representations provided from the addressed text line block of text memory 11 to the internal line buffer.

Video controller 14 acquires from the internal line buffer of text memory 11, across an interconnection designated AD at the exit and entrance thereof of these two system blocks, signals representing 14 bits of the text column word, these being the text character attribute bits. At the same time, character generator 12 acquires from the same text word column across interconnection CD signals representing ten bits with these being the text character definition bits. As video controller 14 acquires the signals based on the text character attribute bits, character generator 12 is acquiring the signals representing the ten text character definition bits to enable it to provide a 16-bit character structure row word at its output. After video controller 14 has finished acquiring signals representing the text character attribute bits, it then is ready to acquire the signals representing the 16-bit character structure row word from character generator 12 before acquiring the signals representing the 14 text character attribute bits in the next text column word.

As indicated above, the character structure row word can be viewed as providing representations of text pixels differing in size from the standard screen pixels, and so video controller 14 treats the bits of such a structure row word as defining text pixels each equal to half of a horizontal screen line pixel. Video controller 14 typically takes pairs of such text pixels to define a screen pixel in a horizontal pixel line on the screen of display monitor 10. The bits of a character structure row word, in being treated as defining text pixels by video controller 14, has the textual character foreground color used for half a screen pixel if the bit has a value of one or the background color for half a screen pixel if the bit value is zero. These half screen pixels are taken together in pairs to provide an entire screen pixel and thus permit offsetting character structural portions by half a screen pixel to give a smoother look to the resulting characters through eliminating some of the "stair step" structural results which would otherwise ensue.

In the manner indicated above in connection with the description of the display of background graphics, graphics controller 16 notes the presence of a border character as part of a window border between side-by-side windows on the screen of display monitor 10 during the sequential acquisition of output signals from the internal line buffer of text memory 11 in the course of providing a pixel display pattern for a horizontal pixel line on the screen of display monitor 10. Again, graphics controller 16 will note which signals have been acquired by video controller 14 in this acquisition sequence. At the border character, graphics controller 16 will provide a new horizontal pixel line number to relative memory 18 which will lead to selecting another block in text memory 11 which will have its contents transferred to the internal line buffer thereof displacing the contents previously there as the result of the provision of the preceding horizontal text line number by graphics controller 16. Video controller 14 will continue acquiring sequentially its appropriate portions of text column words from the output buffer of text memory 11, as will character generator 12, beginning at the same relative point that it left off in acquiring text column word portions provided under the previous horizontal pixel line number supplied by graphics controller 16. The acquisition signal rate from the internal line buffer of text memory 11 is set by video controller 14 in accordance with the display rate on the screen of display monitor 10 and the selected width for the text characters in the textual line. To be in accord with the display rate needed for displaying screen pixels in accord with the information provided by graphics memory 13, the display rate for the display monitor will be sufficient to display on the screen thereof the display having 500 vertical text pixels by 1,376 horizontal text pixels, as the vertical text pixels are one horizontal screen line high just as are screen pixels. All of the display rates set by video controller 14 are derived from a time base set by the output signal of an oscillator, 45, connected to controller 14.

The character structure row numbers supplied from relative memory 18 to row latch 40 after receipt of horizontal pixel line numbers therein from graphics controller 16 contain two bits which, rather than being used for selecting a character structure row, specify other actions. The signal resulting from one of these bits is used to enable the underlining of a textual character by video controller 14 as indicated above. If the proper one of the corresponding 14 text character attribute bits for underlining has a value of one, and if the underline bit in the character structure row number just mentioned also has a value of one, video controller 14 will ignore the directives supplied thereto in the corresponding character text row word and instead rewrite that word to have every bit therein take on a value of one. This results in a horizontal line of pixels in a text column being highlighted to provide an underline for the textual character provided in association therewith.

The remaining bit of the character structure row number stored in row latch 40 not used for the selection of a character structure row has signals representing it transmitted over an interconnection designated CC at its exit from row latch 40 and at its entrance into color palette circuit 15. In color palette circuit 15, these signals are used to select one or the other of two sets of colors for graphics backgrounds and for textual characters and textual character backgrounds, thus broadening the choices available to an operator at keyboard 19 or to an associated one of remote computers 20. Alternatively, one set of colors can be assigned for these purposes and the other set can be assigned for use in various user choice menus which can be provided as displays over parts or all of the windows.

Video controller 14, as has been previously indicated, acquires digital representations from graphics memory 13, and acquires digital representations and directives from text memory 11 and character generator 12, then reconciles the information in these signals to determine what is to be displayed in the next screen pixel in a horizontal screen pixel line on the screen of display monitor 10. As a result of such reconciliation, video controller 14 provides a corresponding four-bit digital signal with the appropriate information for each half screen pixel to color palette circuit 15 over an interconnection designated PD at the exit and entrance therefor between these two system blocks. Video controller 14 serially transfers individual four-bit digital signals for each half screen pixel, or text pixel, to color palette circuit 15 specifying the textual foreground or background color therefor unless the corresponding character attribute bits for color have a value of zero where the specified color for the screen pixel involved is then substituted. Each such half screen pixel four-bit digital signal is converted by color palette circuit 15 into the appropriate red, green and blue voltage levels to operate display monitor 10, as indicated above. Color palette circuit 15 is a commercially available integrated circuit chip manufactured by Inmos Inc. under the designation IMS G170.

Figure 4:
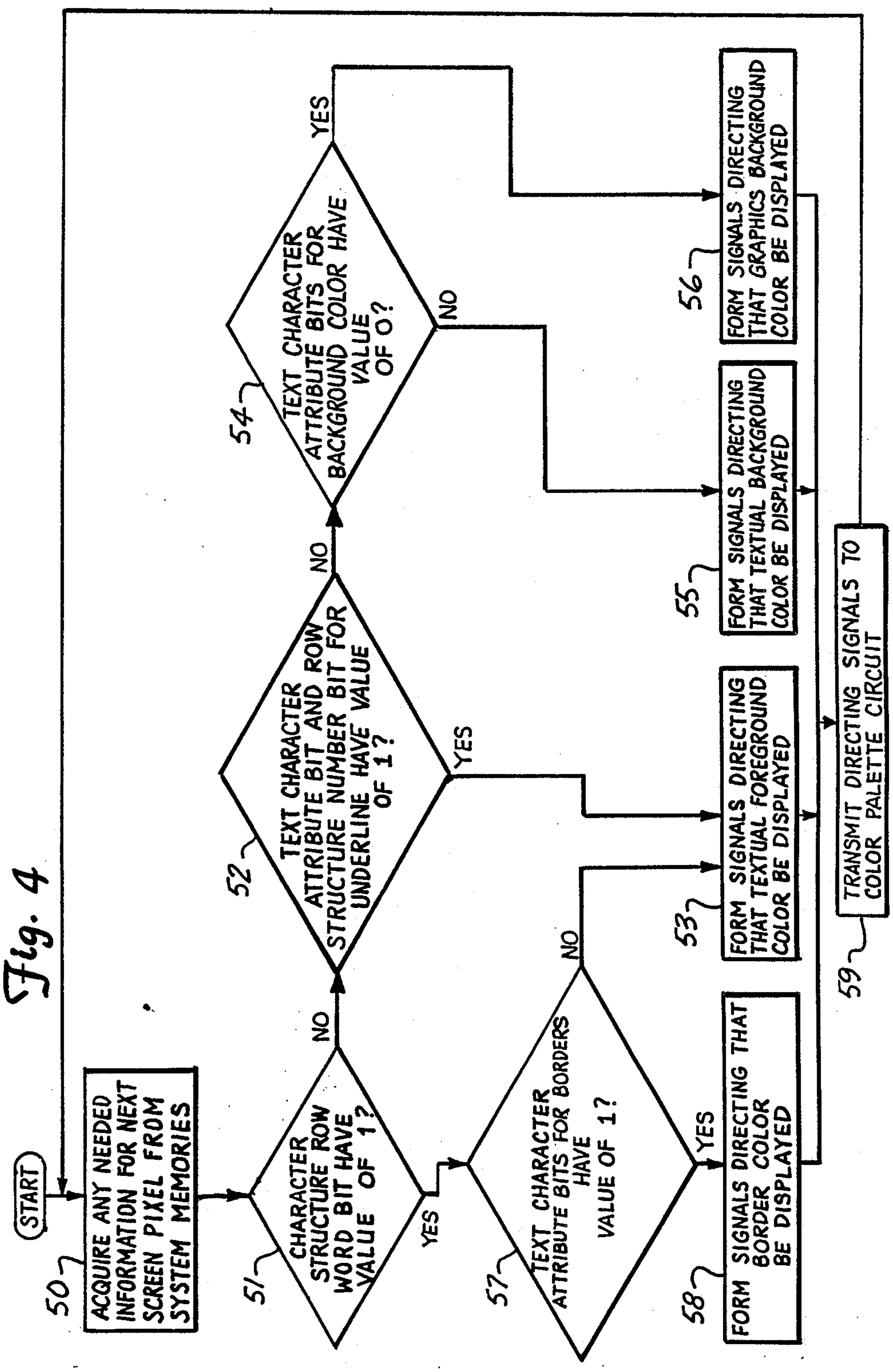

FIG. 4 shows a flow chart with the general steps followed by video controller 14 in making the above indicated reconciliation. This flow chart has a single feedback loop from the finish of the steps performed to the beginning thereof consistent with video controller 14 repetitively performing such steps in providing for the display of screen horizontal pixel line after pixel line for vertical scan after scan. In each of these repetitions, video controller 14 acquires signals from graphics memory 13, text memory 11 and character generator 12 as indicated in a block, 50, in FIG. 4.

Video controller 14 then comes to a decision diamond, 51, as to whether the next character structure row word has a logic value of one. If not, a further decision is reached in another decision diamond, 52, as to whether the corresponding text character attribute bit and the row structure number bit for underlining have values of one. If so, video controller 14 forms signals directing color palette circuit 15 to provide the textual foreground color for the next half screen pixel as indicated in a further block, 53.

If not, a further decision is indicated in another decision diamond 54, determining whether or not the character attribute bits for textual character background color have a value of zero. If not, signals are formed directing that the textual character background color be provided as indicated in another block 55. If so, video controller 14 forms signals directing that the graphics background color be provided as set out in a further block, 56.

Returning to decision diamond 51, if the next character structure row bit did have a value logic value of one, then a further decision diamond, 57, considers the question of whether the text character attribute bits for borders have a logic value of one. If not, video controller 14 forms signals directing color palette circuit 15 to provide the textual foreground color in block 57. If so, video controller 14, in a final signal forming block, 58, forms signals directing that the border color be displayed.

Upon completion of the forming of directive signals in any of blocks 53, 55, 56 or 58, video controller 14 transmits the signals formed to color palette circuit 15 as indicated in a final system block, 59. Video controller 14, as previously indicated, then loops back to the beginning of these steps to repeat the cycle again.

Video controller 14 supplies additional signals to color palette circuit 15 for purposes of control and timing. These signals are provided over an interconnection designated PC at the entrance and exit thereof in these system blocks. The signals for one bit involved are provided to choose between one of 16 colors for pixels which are defined by information from text memory 11 or from one of 16 colors for pixels defined by information obtained from graphics memory 13. This bit is given a value of zero by video controller 14 based on its determination of the presence of a character structure for that pixel, and given a value of one in the absence of such a character structure.

Video controller 14 provides the signals to display the crossed line cursor described above based on signals received from graphics controller 16 as to the location of the parts of that cursor. The signals from another bit in the control signals provided by video controller 14 to color palette circuit 15 are used to provide the colors for those pixels in the cursor rather than the colors used with the pixels defined by either information from graphics memory 13 or from text memory 11. In addition, signals from a further bit are used to select an alternate set of colors for providing a "blinking" display on the screen of display monitor 10. Those pixels which are chosen by an operator at keyboard 19 or by directive of an associated one of remote computers 20 blink between the colors specified therefor by either graphics memory 13 or text memory 11 and the blinking color at a steady blinking rate set by video controller 14.

A further signal is transmitted across the interconnection designated BLK at the exit and entrance point therefor of these two system blocks. This signal is used to "blank" or shut off outputs from color palette circuit 15 during horizontal and vertical retrace periods.

System master clocking oscillator 45 sets the timing for the entire display monitor control system of FIGS. 1A and 1B. Oscillator 45 provides a signal across an interconnection designated OSC at the entrance therefor in video controller 14, the clock signal being provided as a square wave having a frequency of 53.424 mHz. From this master clocking signal the square wave signal on the interconnection SCLK from video controller 14 to graphics controller 16 and microcomputer 17 is derived, the frequency of this system clock being 6.678 mHz. In addition, a clocking signal is provided by video controller 14 to color palette circuit 15 on an interconnection designated POSC at the exit and entrance therefor in these two system blocks. The frequency of this square wave signal is equal to that supplied by oscillator 45, but video controller 14 introduces an appropriate amount of phase shift therein for the proper synchronization of the operation of color palette circuit 15 in connection with video controller 14.

As indicated above, video controller 14 provides signals to text memory 11 and graphics memory 13 to initiate transfers of digital representations of information to the output line buffers therein. These signals travel on the primary command bus C from video controller 14 to graphics memory 13 and to text memory buffer 41. Signals supplied to text memory buffer 41 from video controller 14 are in turn transferred to text memory 11 on command bus TC. Signals between these system blocks provided by video controller 14 to direct the acquisition of signals thereby from graphics memory 13 and text memory 11 are also supplied on the primary command bus C, as are the various storage and retrieval timing signals for all of the memories operated by graphics controller 16.

Although the present invention has been described with reference to preferred embodiments, workers skilled in the art will recognize that changes may be made in form and detail without departing from the spirit and scope of the invention.

What is claimed is:

1. A video display control system for controlling presentation of varying patterns of pixels on a screen of a display monitor in response to selected commands from a control means directing presentations of such pixel patterns as a sequence of lines of sequential pixels, said pixel patterns comprising a composite of both relatively infrequently changing background pixel patterns based on corresponding background data supplied by said control means, and relatively frequently changing foreground pixel patterns based on corresponding foreground data supplied by said control means, said control means comprising:

a background data memory means for receiving at data inputs thereof signals from said control means for at least temporary storage therein representing said background data, and, upon receiving corresponding command signals at command inputs thereof from said control means including receiving an indication of a selected line in said sequence of lines, being capable of providing at outputs thereof signals representing a selected portion of said background data corresponding to said selected line sufficient to supply a basis for forming portions of those background pixel patterns that are to appear in said selected line in locations therein devoid of portions of said foreground pixel patterns, said command inputs thereof and said data inputs thereof at least in part being electrically connected to said control means;

a foreground data memory means for receiving at data inputs thereof signals from said control means for at least temporary storage therein representing said foreground data, and, upon receiving corresponding command signals at command inputs thereof, being capable of providing at outputs thereof signals representing a selected portion of said foreground data corresponding to a designation thereof sufficient to provide a basis for specifying in a line in said sequence of lines where, in that line, portions of said foreground pixel patterns for that line are to be provided and where they are to be omitted, said data inputs thereof at least in part being electrically connected to said control means;

a relative position memory means for receiving at data inputs thereof signals from said control means for at least temporary storage therein representing at least one designation of a portion of said foreground data selected to correspond with at least one line of said sequence of lines, and upon receiving corresponding command signals at said command inputs thereof from said control means including receiving said indication of a selected line, being capable of providing at outputs thereof signals representing that designation corresponding to said selected line, said command inputs thereof and said data inputs thereof at least in part being electrically connected to said control means and said outputs thereof at least in part being electrically connected to said foreground data memory means command inputs; and a display monitor controller means for receiving at data inputs thereof signals, from said background data memory means and said foreground memory means, indicating a pattern of said sequential pixels for said selected line, and being capable of providing at outputs thereof signals for directing a display monitor to provide such a pattern of sequential pixels in said selected line on a screen thereof by providing said portions of foreground pixel data patterns where in said selected line they are specified to be provided and, where they are specified to be omitted, provided corresponding said portions of background pixel patterns, said display monitor controller means data inputs being at least in part electrically connected to said background data memory means outputs and said foreground data memory means outputs.

2. The system of claim 1 further comprising a symbol form memory means for storing symbol forms data therein at least temporarily, and, upon receiving corresponding command signals at command inputs thereof, being capable of providing at outputs thereof signals representing a selected portion of said symbol form data for a selected symbol, said command inputs thereof at least in part being electrically connected to at least some of said foreground data memory means outputs and said display monitor controller means data inputs in part being electrically connected to said symbol form memory means outputs.

3. The system of claim 1 wherein said relative position memory means is also for receiving from said control means at said command inputs thereof signals representing a selected start indication for each said designation, said start indication for indicating which part of said designated portion of said foreground data corresponding to said indicated line will begin specifying at a beginning pixel in said indicated line where portions of said foreground pixel patterns are thereafter to be provided and where omitted, and being capable of further providing at said outputs thereof signals representing that said start indication corresponding to said designation for said indicated line.

4. The system of claim 1 wherein said relative position memory means has a plurality of designations stored therein for a plurality of lines in said sequence of lines with a selected number of said designations being repeated a selected number of times for consecutive lines in said sequence of lines.

5. The system of claim 1 wherein signals provided by said control means for being received by said background data memory means, said foreground data memory means and said relative position memory means representing said background data and said foreground data for storage can be so stored to have parts in first and second data groups in each of said background and foreground data memory means with corresponding data group pairs formed by said first data groups from each and said second data groups from each with each said data group pair based on signal transfers to said control means from independent command and data sources, said background data memory means being capable of providing at outputs thereof signals representing a selected portion of said background data from a selected one of said first and second data groups therein corresponding to said selected line depending on whether said selected line is in a first fraction of said sequence of lines versus being in a second fraction of said sequence of lines, said foreground data memory means being capable of providing at outputs thereof signals representing a designated portion of said foreground data from a selected one of said first and second data groups therein corresponding to said designation depending on whether said selected line is in a first fraction of said sequence of lines versus being in a second fraction of said sequence of lines.

6. The system of claim 1 wherein signals provided by said control means for being received by said background data memory means, said foreground data memory means and said relative position memory means representing said background data and said foreground data for storage can be so stored to have parts in start and finish data groups in each of said background and foreground data memory means with corresponding data group pairs formed by said start data groups from each and said finish data groups from each with each said data group pair based on signal transfers to said control means from independent command and data sources, said background data memory means being capable of providing at outputs thereof signals representing a selected portion of said background data from a selected one of said start and finish data groups therein corresponding to said selected line depending on whether said display monitor controller means is providing at outputs thereof signals for directing a display monitor to provide a pattern of sequential pixels in said selected line on one side of a selected location in that said selected line or on that other side remaining, said foreground data memory means being capable of providing at outputs thereof signals representing a designated portion of said foreground data from a selected one of said start and finish data groups therein corresponding to said designation depending on whether said display monitor controller means is providing at outputs thereof signals for directing a display monitor to provide a pattern of sequential pixels in said selected line on one side of a selected location in that said selected line or on that other side remaining.

7. The system of claim 2 wherein said relative position memory means is also for receiving from said control means at said command inputs thereof signals representing a form portion selection indication for each said designation, said form portion selection indication for indicating which portion of said symbol forms of selected symbols will be provided in said indicated line as specified by said designated portion of said foreground data for that line, and being capable of further providing at said outputs thereof signals representing that said form portion selection indication corresponding to said indicated line; and further comprising a portion indication memory means having its inputs electrically connected to at least some of said outputs of said relative position memory means to receive signals therefrom for temporary storage, and having outputs thereof electrically connected to at least some of said symbol form memory means command inputs.

8. The system of claim 2 wherein said relative position memory means is also for receiving from said control means at said command inputs thereof signals representing a selected start indication for each said designation, said start indication for indicating which part of said designated portion of said foreground data corresponding to said indicated line will begin specifying at a beginning pixel in said indicated line where thereafter portions of said foreground pixel patterns are to be provided and where omitted, and being capable of further providing at said outputs thereof signals representing that said start indication corresponding to said designation for said indicated line.

9. The system of claim 2 wherein said relative position memory means has a plurality of designations stored therein for a plurality of lines in said sequence of lines with a selected number of said designations being repeated a selected number of times for consecutive lines in said sequence of lines.

10. The system of claim 2 wherein signals provided by said control means for being received by said background data memory means, said foreground data memory means and said relative position memory means representing said background data and said foreground data for storage can be so stored to have parts in first and second data groups in each of said background and foreground data memory means with corresponding data group pairs formed by said first data groups from each and said second data groups from each with each said data group pair based on signal transfers to said control means from independent command and data sources, said background data memory means being capable of providing at outputs thereof signals representing a selected portion of said background data from a selected one of said first and second data groups therein corresponding to said selected line depending on whether said selected line is in a first fraction of said sequence of lines versus being in a second fraction of said sequence of lines, said foreground data memory means being capable of providing at outputs thereof signals representing a designated portion of said foreground data from a selected one of said first and second data groups therein corresponding to said designation depending on whether said selected line is in a first fraction of said sequence of lines versus being in a second fraction of said sequence of lines.

11. The system of claim 2 wherein signals provided by said control means for being received by said background data memory means, said foreground data memory means and said relative position memory means representing said background data and said foreground data for storage can be so stored to have parts in start and finish data groups in each of said background and foreground data memory means with corresponding data group pairs formed by said start data groups from each and said finish data groups from each with each said data group pair based on signal transfers to said control means from independent command and data sources, said background data memory means being capable of providing at outputs thereof signals representing a selected portion of said background data from a selected one of said start and finish data groups therein corresponding to said selected line depending on whether said display monitor controller means is providing at outputs thereof signals for directing a display monitor to provide a pattern of sequential pixels in said selected line on one side of a selected location in that said selected line or on that other side remaining, said foreground data memory means being capable of providing at outputs thereof signals representing a designated portion of said foreground data from a selected one of said start and finish data groups therein corresponding to said designation depending on whether said display monitor controller means is providing at outputs thereof signals for directing a display monitor to provide a pattern of sequential pixels in said selected line on one side of a selected location in that said selected line or on that other side remaining.

12. The system of claim 3 wherein said start indication specifies a shift in said foreground data memory means of said designated portion of said foreground data.

13. The system of claim 6 wherein signals provided by said control means for being received by said background data memory means, said foreground data memory means and said relative position memory means representing said background data and said foreground data for storage can be so stored to have parts in first and second data groups in each of said start and finish groups in said background data memory means and in each of said start and finish groups in said foreground data memory means with corresponding data group pairs formed by (a) said first data groups from said start groups in each of said background and foreground data memory means, (b) said first data groups from said finish groups in each of said background and foreground data memory means, (c) said second data groups from said start groups in each of said background and foreground data memory means, and (d) said second data groups from said finish groups in each of said background and foreground data memory means, and with each said data group pair based on signal transfers to said control means from independent command and data sources; said background data memory means being capable of providing at outputs thereof signals representing a selected portion of said background data corresponding to said selected line from a selected one of said first and second data groups, whether in said start or finish data groups therein, depending on whether said selected line is in a first fraction of said sequence of lines versus being in a second fraction of said sequence of lines; said foreground data memory means being capable of providing at outputs thereof signals representing a designated portion of said foreground data corresponding to said designation from a selected one of said first and second data groups, whether in said start or finish data groups therein, depending on whether said selected line is in a first fraction of said sequence of lines versus being in a second fraction of said sequence of lines.

14. The system of claim 7 wherein said relative position memory means is also for receiving from said control means at said command inputs thereof signals representing a selected start indication for each said designation, said start indication for indicating which part of said designated portion of said foreground data corresponding to said indicated line will begin specifying at a beginning pixel in said indicated line where thereafter portions of said foreground pixel patterns are to be provided and where omitted, and being capable of further providing at said outputs thereof signals representing that said start indication corresponding to said designation for said indicated line.

15. The system of claim 7 wherein said relative position memory means has a plurality of designations stored therein for a plurality of lines in said sequence of lines with a selected number of said designations being repeated a selected number of times for consecutive lines in said sequence of lines.

16. The system of claim 7 wherein signals provided by said control means for being received by said background data memory means, said foreground data memory means and said relative position memory means representing said background data and said foreground data for storage can be so stored to have parts in first and second data groups in each of said background and foreground data memory means with corresponding data group pairs formed by said first data groups from each and said second data groups from each with each said data group pair based on signal transfers to said control means from independent command and data sources, said background data memory means being capable of providing at outputs thereof signals representing a selected portion of said background data from a selected one of said first and second data groups therein corresponding to said selected line depending on whether said selected line is in a first fraction of said sequence of lines versus being in a second fraction of said sequence of lines, said foreground data memory means being capable of providing at outputs thereof signals representing a designated portion of said foreground data from a selected one of said first and second data groups therein corresponding to said designation depending on whether said selected line is in a first fraction of said sequence of lines versus being in a second fraction of said sequence of lines.

17. The system of claim 7 wherein signals provided by said control means for being received by said background data memory means, said foreground data memory means and said relative position memory means representing said background data and said foreground data for storage can be so stored to have parts in start and finish data groups in each of said background and foreground data memory means with corresponding data group pairs formed by said start data groups from each and said finish data groups from each with each said data group pair based on signal transfers to said control means from independent command and data sources, said background data memory means being capable of providing at outputs thereof signals representing a selected portion of said background data from a selected one of said start and finish data groups therein corresponding to said selected line depending on whether said display monitor controller means is providing at outputs thereof signals for directing a display monitor to provide a pattern of sequential pixels in said selected line on one side of a selected location in that said selected line or on that other side remaining, said foreground data memory means being capable of providing at outputs thereof signals representing a designated portion of said foreground data from a selected one of said start and finish data groups therein corresponding to said designation depending on whether said display monitor controller means is providing at outputs thereof signals for directing a display monitor to provide a pattern of sequential pixels in said selected line on one side of a selected location in that said selected line or on that other side remaining.

18. The system of claim 8 wherein said start indication specifies a shift in said foreground data memory means of said designated portion of said foreground data.

19. The system of claim 11 wherein signals provided by said control means for being received by said background data memory means, said foreground data memory means and said relative position memory means representing said background data and said foreground data for storage can be so stored to have parts in first and second data groups in each of said start and finish groups in said background data memory means and in each of said start and finish groups in said foreground data memory means with corresponding data group pairs formed by (a) said first data groups from said start groups in each of said background and foreground data memory means, (b) said firs data groups from said finish groups in each of said background and foreground data memory means, (c) said second data groups from said start groups in each of said background and foreground data memory means, and (d) said second data groups from said finish groups in each of said background and foreground data memory means, and with each said data group pair based on signal transfers to said control means from independent command and data sources; said background data memory means being capable of providing at outputs thereof signals representing a selected portion of said background data corresponding to said selected line from a selected one of said first and second data groups, whether in said start or finish data groups therein, depending on whether said selected line is in a first fraction of said sequence of lines versus being in a second fraction of said sequence of lines; said foreground data memory means being capable of providing at outputs thereof signals representing a designated portion of said foreground data corresponding to said designation from a selected one of said first and second data groups, whether in said start or finish data groups therein, depending on whether said selected line is in a first fraction of said sequence of lines versus being in a second fraction of said sequence of lines.

20. The system of claim 14 wherein said start indication specifies a shift in said foreground data memory means of said designated portion of said foreground data.

21. The system of claim 17 wherein signals provided by said control means for being received by said background data memory means, said foreground data memory means and said relative position memory means representing said background data and said foreground data for storage can be so stored to have parts in first and second data groups in each of said start and finish groups in said background data memory means and in each of said start and finish groups in said foreground data memory means with corresponding data group pairs formed by (a) said first data groups from said start groups in each of said background and foreground data memory means, (b) said first data groups from said finish groups in each of said background and foreground data memory means, (c) said second data groups from said start groups in each of said background and foreground data memory means, and (d) said second data groups from said finish groups in each of said background and foreground data memory means, and with each said data group pair based on signal transfers to said control means from independent command and data sources; said background data memory means being capable of providing at outputs thereof signals representing a selected portion of said background data corresponding to said selected line from a selected one of said first and second data groups, whether in said start or finish data groups therein, depending on whether said selected line is in a first fraction of said sequence of lines versus being in a second fraction of said sequence of lines; said foreground data memory means being capable of providing at outputs thereof signals representing a designated portion of said foreground data corresponding to said designation from a selected one of said first and second data groups, whether in said start or finish data groups therein, depending on whether said selected line is in a first fraction of said sequence of lines versus being in a second fraction of said sequence of lines.

* * * * *

UNITED STATES PATENT AND TRADEMARK OFFICE
CERTIFICATE OF CORRECTION

PATENT NO. : 4,965,670

DATED : October 23, 1990

INVENTOR(S) : Gary M. Klinefelter

It is certified that error appears in the above-identified patent and that said Letters Patent is hereby corrected as shown below:

Col. 35, line 27, delete "firs", insert --first--.

Signed and Sealed this

Twenty-first Day of July, 1992

*Attest:*

DOUGLAS B. COMER

*Attesting Officer*

*Acting Commissioner of Patents and Trademarks*